(12) United States Patent
Duraiswamy et al.

(10) Patent No.: US 8,700,256 B2
(45) Date of Patent: Apr. 15, 2014

(54) VEHICLE DISTURBANCE ESTIMATOR AND METHOD

(75) Inventors: Shivkumar Duraiswamy, Portland, OR (US); Dieter Reckels, Portland, OR (US)

(73) Assignee: Daimler Trucks North America LLC, Portland, OR (US)

( * ) Notice: Subject to any disclaimer, the term of this patent is extended or adjusted under 35 U.S.C. 154(b) by 1611 days.

(21) Appl. No.: 12/197,064

(22) Filed: Aug. 22, 2008

(65) Prior Publication Data

US 2010/0049400 A1    Feb. 25, 2010

(51) Int. Cl.
| G06F 17/00 | (2006.01) |
| G06F 19/00 | (2011.01) |
| B60T 8/32 | (2006.01) |

(52) U.S. Cl.
USPC ............ 701/36; 701/33.4; 701/34.2; 701/93; 340/439

(58) Field of Classification Search
USPC ............ 701/1, 29, 33, 35, 36, 70, 72, 79, 80, 701/93, 94, 99, 29.1, 29.3, 29.4, 29.6, 30.2, 701/30.4, 30.8, 30.9, 31.1, 31.2, 32.1, 32.3, 701/32.4, 32.5, 32.8, 32.9, 33.4, 34.2; 180/170, 197; 340/425.5, 438, 439
See application file for complete search history.

(56) References Cited

U.S. PATENT DOCUMENTS

| 3,927,579 A | 12/1975 | Golan |
| 4,922,428 A | 5/1990 | Takahashi |
| 5,094,213 A | 3/1992 | Dudek et al. |
| 5,293,553 A | 3/1994 | Dudek et al. |
| 5,546,311 A | 8/1996 | Sekine |
| 5,713,428 A | 2/1998 | Linden et al. |
| 5,774,820 A | 6/1998 | Linden et al. |
| 5,832,400 A | 11/1998 | Takahashi et al. |

(Continued)

FOREIGN PATENT DOCUMENTS

| CA | 2240057 | 2/2001 |
| EP | 1302356 A1 | 4/2003 |
| WO | WO 03/041987 | 5/2003 |
| WO | WO 2006/107267 | 4/2006 |

OTHER PUBLICATIONS

Office Action from the United States Patent and Trademark Office in U.S. Appl. No. 11/166,735 (concerning published Application 2004/00293822 A1), dated Sep. 12, 2008.

(Continued)

*Primary Examiner* — Thomas Tarcza
*Assistant Examiner* — Edward Pipala
(74) *Attorney, Agent, or Firm* — Klarquist Sparkman, LLP

(57) ABSTRACT

A Vehicle Disturbance Estimator determines estimates of a vehicle disturbance force according to vehicle operating conditions. The determined vehicle disturbance force estimate can be used, for example, in connection with controlling a cruise control system for the vehicle, in connection with fuel economy evaluations and testing, and in connection with vehicle diagnostics. A plurality of sets of inputs can be used to determine plural vehicle disturbance estimates for time periods during which a cruise control is on, the vehicle is being driven in the highest gear, and the vehicle is not being braked by any brakes. The plurality of vehicle disturbance estimates can be averaged to provide an output corresponding to an average vehicle disturbance estimate over a plurality of sampling time periods. Kalman filtering can be used to determine the vehicle disturbance estimates. Signals corresponding to the plural disturbance estimates can be provided as an input to a cruise control, with the cruise control then being operable to control the speed of the motor vehicle, based at least in part upon the vehicle disturbance estimate.

34 Claims, 12 Drawing Sheets

(56) References Cited

U.S. PATENT DOCUMENTS

| | | |
|---|---|---|
| 5,995,895 A | 11/1999 | Watt et al. |
| 6,070,118 A | 5/2000 | Ohta et al. |
| 6,076,036 A | 6/2000 | Price et al. |
| 6,167,357 A | 12/2000 | Zhu et al. |
| 6,249,723 B1 | 6/2001 | Lutz |
| 6,278,931 B1 | 8/2001 | Crawford et al. |
| 6,349,253 B1 | 2/2002 | Bellinger |
| 6,353,785 B1 | 3/2002 | Shuman et al. |
| 6,370,451 B2 | 4/2002 | Lutz |
| 6,370,472 B1 | 4/2002 | Fosseen |
| 6,374,173 B1 | 4/2002 | Ehlbeck |
| 6,387,011 B1 | 5/2002 | Bellinger |
| 6,436,005 B1 | 8/2002 | Bellinger |
| 6,438,510 B2 | 8/2002 | Zhu et al. |
| 6,470,257 B1 | 10/2002 | Seto |
| 6,546,329 B2 | 4/2003 | Bellinger |
| 6,577,937 B1 | 6/2003 | Shuman et al. |
| 6,591,174 B2 | 7/2003 | Chung et al. |
| 6,675,081 B2 | 1/2004 | Shuman et al. |
| 6,819,995 B2 | 11/2004 | Bellinger |
| 6,836,719 B2 | 12/2004 | Andersson et al. |
| 6,839,619 B2 | 1/2005 | Bellinger |
| 6,944,532 B2 | 9/2005 | Bellinger |
| 6,957,139 B2 | 10/2005 | Bellinger |
| 6,990,401 B2 | 1/2006 | Neiss |
| 7,225,073 B2 | 5/2007 | Hedman et al. |
| 7,347,168 B2 | 3/2008 | Reckels et al. |
| 7,424,868 B2 | 9/2008 | Reckels et al. |
| 2003/0221886 A1 | 12/2003 | Petrie, Jr. |
| 2004/0167705 A1 | 8/2004 | Lingman et al. |
| 2005/0085966 A1 | 4/2005 | Eriksson et al. |
| 2006/0095178 A1 | 5/2006 | Guilfoyle et al. |
| 2006/0102399 A1 | 5/2006 | Guilfoyle et al. |
| 2006/0293822 A1 | 12/2006 | Lattemann et al. |
| 2007/0067087 A1 | 3/2007 | Ohshima |
| 2007/0112475 A1 | 5/2007 | Koebler et al. |

OTHER PUBLICATIONS

Notice of Allowance and Fee(s) Due from the United States Patent and Trademark Office in U.S. Appl. No. 11/513,678, dated Jun. 28, 2007, and Examiner's Stated Reasons for Allowance.

Office Action from the United States Patent and Trademark Office in U.S. Appl. No. 11/803,850, dated Oct. 23, 2007.

Predictive Control Method and Apparatus for Vehicle Automatic Transmission (undated, document refers to U.S. Appl. No. 10/264,253, filed Oct. 4, 2002).

JP7117524 to Hirotoshi et al. published May 9, 1995. With English language abstract.

JP7117524 to Hirotoshi et al. published May 9, 1995. Machine translation to English language.

German Application "Drive Train of a Motor Vehicle", pp. 1-13, Abstract and Figures 1-4b, Jul. 19, 2004. (English-Language).

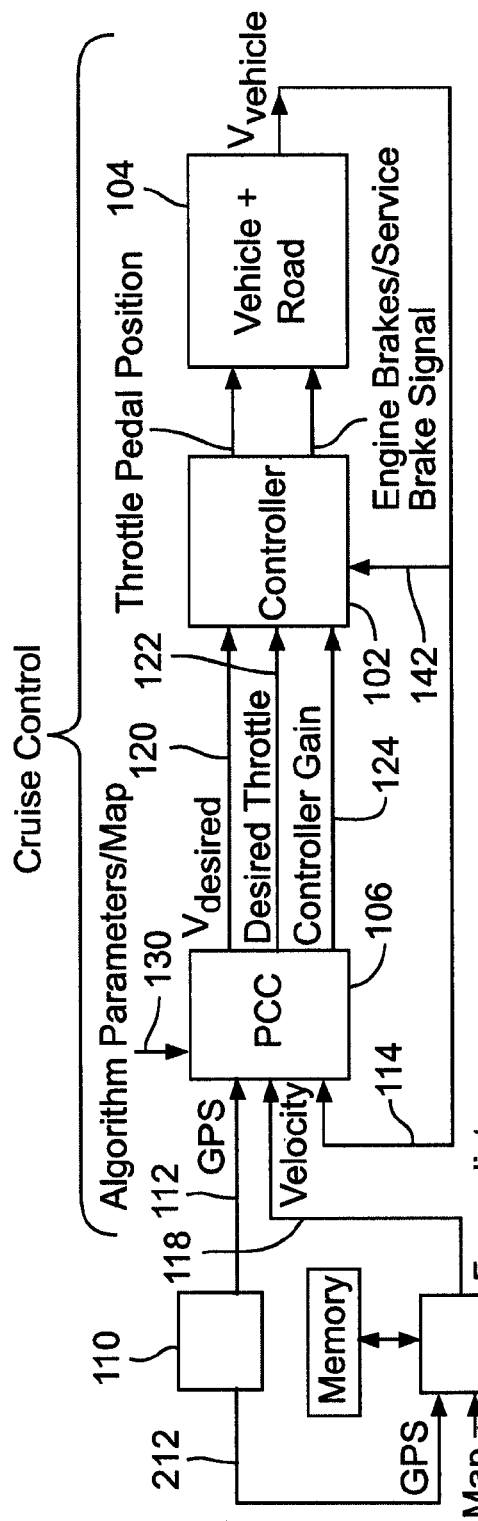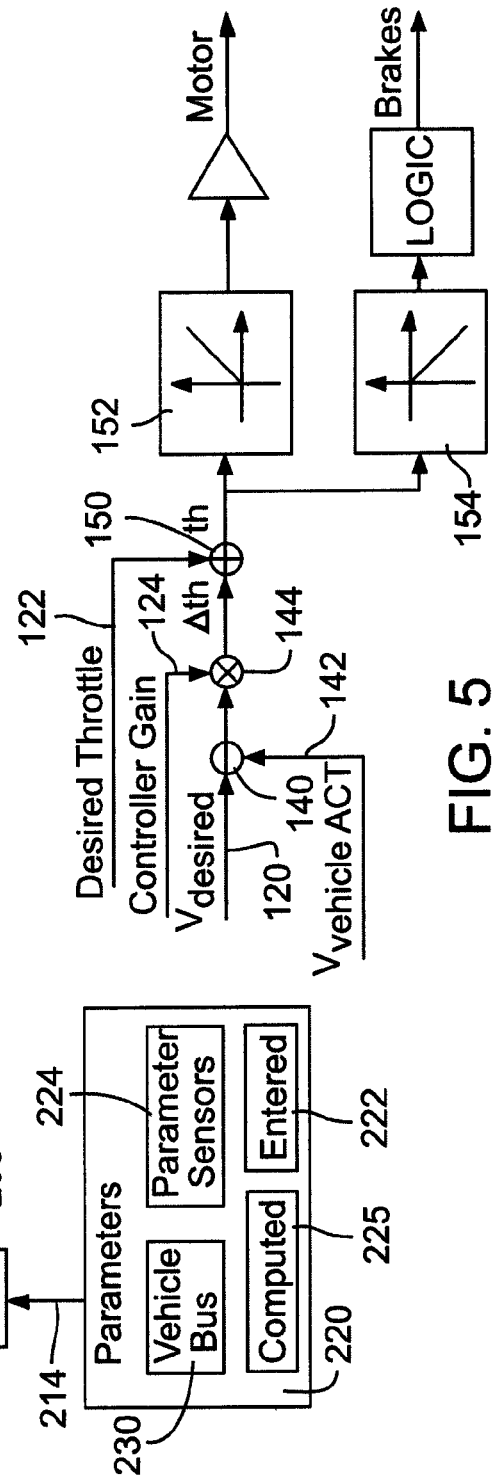
FIG. 4
FIG. 5

VEHICLE DISTURBANCE ESTIMATOR AND METHOD

TECHNICAL FIELD

The technology disclosed herein relates to estimating forces acting on motor vehicles, which estimates can then be used, for example, in connection with the control of a cruise control system for the vehicle, in connection with vehicle diagnostics, and in connection with fuel economy testing.

BACKGROUND

Conventional cruise control systems seek to maintain vehicle speed at a preset value, which is ordinarily input to the system by an operator of the vehicle. For this purpose, known cruise control systems can include sensors for detecting actual vehicle speed, which is fed to a controller and compared with the desired vehicle speed. The vehicle throttle is then adjusted based on an error signal and a control algorithm. In addition, such systems can also include sensors for detecting obstacles in the path of the vehicle, and for adjusting the vehicle speed accordingly.

One specific known cruise control system is disclosed in U.S. Pat. No. 6,990,401 to Neiss et al., and entitled Predictive Speed Control for a Motor Vehicle. This Neiss et al. patent is understood to disclose a vehicle control system that continually adjusts vehicle control parameters based on some vehicle operating conditions as well as stored route information, using an analytic function to determine an optimal speed for the vehicle. Although such a cruise control system is advantageous, improved cruise control in the face of widely varying vehicle operating conditions and parameters is nevertheless desirable.

Cruise control systems, such as described above, use mathematical models of a vehicle to compute the optimal desired cruise speed. The underlying mathematical model utilizes information about the vehicle model and parameters such as the drag coefficient and rolling coefficient in the cruise control. However, the Neiss et al. patent uses nominal parameter values for a number of these parameters. Under at least certain vehicle operating conditions, there can exist a big mismatch between a model utilizing such nominal parameter values and the actual operation of the vehicle, which can result in inefficient cruise control.

SUMMARY

A Vehicle Disturbance Estimator determines estimates of a vehicle disturbance force according to vehicle operating conditions. The determined vehicle disturbance force estimates can be used, for example, in connection with controlling a cruise control system for the vehicle, in connection with fuel economy evaluations, and in connection with vehicle diagnostics. A plurality of inputs can be used to determine plural vehicle disturbance estimates for time periods during which a cruise control is on, the vehicle is being driven in the highest gear, and the vehicle is not being braked by any brakes. A plurality of vehicle disturbance estimates can be combined, such as averaged, to provide an output corresponding to an average vehicle disturbance estimate over a plurality of sampling time periods. Kalman filtering, for example, can be used in determining the vehicle disturbance estimates. Signals corresponding to disturbance estimates can be provided as inputs to a cruise control, with the cruise control then being operable to control the speed of the motor vehicle based at least in part upon the vehicle disturbance estimates.

In accordance with one aspect of the disclosure, a Vehicle Disturbance Estimator (VDE) calculates the vehicle disturbance due to environmental conditions based on specified available signals in real-time. The vehicle disturbance is an indicator of forces affecting the longitudinal dynamics of operation of the vehicle. Rather than computing the individual impact on longitudinal dynamics of individual conditions and vehicle operating parameters, such as wind conditions, rolling resistance, whether certain components of the vehicle are being operated and so forth, desirably, the calculated vehicle disturbance estimates correspond to the lumped contributions of plural factors on longitudinal vehicle dynamics.

In accordance with one embodiment, a VDE algorithm can be run from time-to-time, such as periodically over respective sampling time periods, when suitable conditions exist. As a specific example, a VDE algorithm can be run and vehicle disturbance estimates determined when the vehicle is in its maximum or top gear (e.g. gear 10 for a 10-speed truck); brakes are not being applied to slow the vehicle (e.g. no service, engine, or parking brakes are being applied); and the vehicle is in a cruise control mode, with the cruise control being active to control the vehicle, which thereby eliminates the impact of human intervention from operation of the throttle of the vehicle. A conventional cruise control can be used.

A vehicle control algorithm based on longitudinal dynamics of a vehicle being operated requires accurate vehicle parameters for efficient control. Estimating the vehicle disturbance and providing this information to the control algorithms, such as a cruise control, can result in a significant increase in control efficiency. However, typical control systems such as the Neiss, et al. patent use nominal parameter values for a variety of significant parameters (e.g. wind and rolling resistance), which in turn are not optimal if the wind and rolling resistance operating conditions change. Estimated vehicle disturbance values determined in accordance with this disclosure can be passed on to a control algorithm, such as an input to a cruise control algorithm to provide compensation for changes in operating conditions to thereby improve the operation of the cruise control and improve fuel economy in many cases. A cruise control can be operated in its standard mode (without a VDE input) in the event conditions exist that indicate a vehicle disturbance estimate is not to be calculated (e.g. the vehicle is not in its top gear).

In accordance with an embodiment, a VDE uses information concerning a vehicle's current position, including elevation information. This information can come from a GPS system. Alternatively, the vehicle's current position can be determined from a GPS signal with the position information being used in combination with a three-dimensional road map database that includes elevation information. From this information, the grade of the road being traveled by the motor vehicle can be determined. The grade of the road being traveled by the motor vehicle can otherwise be estimated or determined. A microprocessor, which can be a dedicated processor or a microprocessor or controller used for other functions on a vehicle, receives first, second and third sets of inputs which can be processed by the microprocessor to provide one or more, and desirably plural, vehicle disturbance estimates. The first inputs can correspond to first parameters such as to parameters that include parameters that can be determined in advance, such as values for parameters relating to characteristics of the particular vehicle being used. Initial nominal values for certain parameters can also be included. The second set of inputs can correspond to second parameters including parameters that vary over time with the operation of the vehicle. These second parameters can comprise parameters having corresponding representative signals available in a conventional manner on a vehicle bus (such as a J1939 bus for a truck) that are provided to the microprocessor. In one desirable embodiment, all of the second parameters are available from the vehicle bus. These second parameters are typically obtained from sensors at various locations and then converted in a conventional manner to signals on the bus that correspond to the parameters on the bus. Alternatively, sensors can have outputs coupled to one or more inputs to the microprocessor to provide signals to the microprocessor without utilizing the vehicle bus. As another alternative, the second parameters in many cases can be calculated from other parameters or data. The third set of inputs to the microprocessor comprise inputs corresponding to the grade of the road being traveled by the vehicle. In this embodiment, the microprocessor is operable to process the first, second and third sets of inputs to determine at least one vehicle disturbance estimate, and more desirably, to determine plural vehicle disturbance estimates for time periods during which the following conditions exist: the cruise control is on, the vehicle is being driven in the highest gear, and the vehicle is not being braked by any brakes. Output signals corresponding to the plural disturbance estimates can be stored in memory. Alternatively, these outputs can be used as input signals for use in controlling the operation of a cruise control.

The vehicle disturbance estimates can also be used in diagnosing motor vehicle performance, based upon computed vehicle disturbance estimates. For example, assuming a vehicle is driven over a first route and vehicle disturbance estimates corresponding to the first route are stored. The stored vehicle disturbance estimates over various portions of the route may be compared. Also, stored vehicle disturbance estimates from one run of the vehicle over the first route can be compared with stored vehicle disturbance estimates from a second run of the vehicle over the first route. If the compared vehicle disturbance estimates vary significantly, such as in excess of a threshold, the difference in the vehicle disturbance estimates provides an indication that the vehicle should be examined to determine an explanation of the difference. The difference may be explainable due to environmental conditions, such as the truck heading into a strong headwind on one run of a route or portion of the route, as compared to another run or a different portion of the route. However, the difference can also indicate that a vehicle component affecting the longitudinal dynamics of the vehicle operation is malfunctioning. As one specific example, vehicle disturbance estimates of a vehicle over one route differed significantly (by more than a threshold) from vehicle disturbance estimates at a later run of the vehicle over the same route. This was due to a leak in an air pressure line to a trailer which caused an air compressor to recycle on and off much more frequently on one run of the route in comparison to another run of the route. The VDE varied over the two routes due to a negative disturbance force component arising from the torque required to operate the compressor excessively.

As another example, in fuel economy test runs, at least one, and more typically a plurality of vehicle disturbance estimates can be determined for a fuel efficiency test run of a vehicle over a route and stored in memory. Second vehicle disturbance estimates can be determined for another fuel efficiency test run of the vehicle over the route and stored in memory. In the event the vehicle disturbance estimates for one of the test runs exceeds a threshold, the results of the fuel efficiency test run in that case can be discarded as being an atypical result. For example, a strong headwind can result in an extremely high vehicle disturbance estimate and provide a reason for negating or discarding the particular fuel efficiency test run result.

Various techniques can be used to process the parameters to determine vehicle disturbance estimate. Kalman filtering is a particularly desirable approach. Other approaches include recursive least squares (with ignore, ignoring the disturbance force because it is time varying parameter), and non-linear least squares.

In accordance with an embodiment, the first, second and third inputs, corresponding to the grade of the road being traveled by the motor vehicle, are used by the microprocessor to determine plural vehicle disturbance estimates for time periods during which the following conditions exist: the vehicle cruise control is on, the vehicle is being driven in the highest gear, and the vehicle is not being braked. In this embodiment, signals corresponding to plural vehicle disturbance estimates are determined and can be stored in memory. The stored vehicle disturbance estimates can be used, for example, as an input to the cruise control with the cruise control being operable to control the speed of the motor vehicle based on averages of vehicle disturbance estimates, in addition to other parameters used by the cruise control. The vehicle disturbance estimates can be averaged with a signal corresponding to an average vehicle disturbance estimate being used as input to the cruise control. The average vehicle disturbance estimate signal can correspond to an average of vehicle disturbance estimates. Disturbance estimates can be computed for respective sampling time periods. The microprocessor can average signals corresponding to plural vehicle disturbance estimates to provide an output corresponding to an average vehicle disturbance estimate over a plurality of sampling time periods. The microprocessor can apply Kalman filtering to the first, second and third inputs to determine the vehicle disturbance estimates.

In accordance with one embodiment, the first set of first inputs comprise inputs corresponding to first parameters of the motor vehicle, the first parameters comprising: gross vehicle mass; static wheel radius; nominal drag coefficient; nominal rolling resistance coefficient; and vehicle frontal area. In accordance with this embodiment, the second set of second inputs comprise inputs corresponding to second parameters of the motor vehicle, the second parameters comprising: engine brake state; engine torque; engine speed; wheel based vehicle speed; and service brake state.

In accordance with another embodiment, the first set of inputs can be expanded to comprise inputs corresponding to a second set of first parameters, including: engine and flywheel inertia; total wheel inertia; transmission efficiency per gear; and rear axle efficiency per gear, in addition to the first set of first parameters. In accordance with an embodiment, the first set of inputs can be further expanded to comprise inputs corresponding to a third set of first parameters that comprise: truck type; truck model; truck configuration; transmission type; real axle type; tractor-trailer gap; tire pressure and temperature; wind direction and velocity; and road surface condition. It should be noted that some of the parameters in this third set of first parameters are parameters that can vary over time, such as temperature, wind direction and velocity, and road surface conditions. Nominal values for such parameters, or initial values can be entered and adjusted over time as new data becomes available.

In addition, in accordance with an embodiment, the second set of inputs can be expanded to include inputs corresponding to a second set of second parameters, including the fan drive state and friction torque. In accordance with a further embodiment, the second set of inputs can be further expanded to comprise inputs corresponding to a third set of second parameters that include: bunk blower fan state; cab blower fan state; air conditioning compressor state; non-driven wheel speed; transmission driveline engaged; engine percent load at current speed, transmission current gear; longitudinal acceleration; estimated engine parasitic losses—percent torque for fan and fuel pump; barometric pressure; and ambient air temperature.

The second set of inputs can be further expanded to include inputs corresponding to a fourth set of second parameters that include: transmission shift in process; transmission output shaft speed; and transmission input shaft speed. From the fourth set of second set of parameters, one can determine whether the vehicle is in the top gear.

The second set of inputs can be expanded in accordance with an embodiment to include inputs corresponding to a fifth set of second parameters that further include the transmission actual gear ratio. The transmission actual gear ratio can be used to determine whether the vehicle is in a top gear, as an alternative approach.

In addition, in accordance with an embodiment, the second set of inputs can be expanded to include inputs corresponding to a sixth set of second parameters that further include the clutch shift status or state, which can be used to indicate whether a vehicle is being shifted and thereby is not in a gear such as the top vehicle gear.

The second set of inputs can be further expanded in accordance with an embodiment to comprise inputs corresponding to a seventh set of second parameters that include: windshield wiper state; transmission driveline engaged; transmission shift in process; transmission output shaft speed; transmission input shaft speed; transmission actual gear ratio; transmission current gear; the clutch switch state; tire pressure and temperature; wind direction and velocity; and road surface condition.

To provide vehicle disturbance estimates that are particularly useful, in accordance with embodiments, the first set of first inputs as a minimum correspond to the first set of first parameters and the second set of inputs correspond as a minimum to the first set of second parameters. The first set of first parameters and first set of second parameters, together with the third set of inputs, are processed by the microprocessor to provide at least one, and desirably plural vehicle disturbance estimates. It should be noted that the terms first, second and third sets of inputs are used for convenience and do not require separated sets of inputs. That is, if all of the inputs included in specified first, second and third sets of inputs are included in an embodiment regardless of whether they are commingled, the first, second and third sets are present.

In accordance with alternative embodiments, the first set of first inputs can be combined with one or both of the second and third sets of first inputs and the first set of second inputs can be combined with one or more of the second through seventh sets of second inputs, to provide more refined vehicle disturbance estimates.

The vehicle disturbance estimates desirably comprise lump signals corresponding to plural forces acting along the longitudinal axis of the motor vehicle. As a specific example, the plural forces can correspond at least in part to lump contributions of rolling resistance forces and wind forces determined in real time. In another aspect of embodiments, the plural forces can correspond at least in part to forces retarding the acceleration of the vehicle arising from the operation of one more auxiliary components of the motor vehicle. These auxiliary components can comprise, for example, an engine cooling fan of the vehicle. In addition, the auxiliary components can also comprise one or more of cab and bunk blowers and vehicle air conditioning compressor.

The foregoing and other features that illustrate the invention will become more apparent from the following detailed description, which proceeds with reference to the accompanying figures.

BRIEF DESCRIPTION OF THE DRAWINGS

FIG. 4 shows the structure of an exemplary embodiment of a cruise control system and vehicle disturbance estimator.

FIG. 5 is a block diagram of a linear controller usable in the FIG. 4 embodiment.

DETAILED DESCRIPTION

An embodiment of the Vehicle Disturbance Estimator (VDE) calculates the vehicle disturbance due to environmental conditions and vehicle operating parameters, including based on certain conditions and parameters available as signals in real-time. The vehicle disturbance provides and indicator of forces affecting the longitudinal dynamics of a vehicle.

A mathematical model of a vehicle driving on the road can be derived from Newton's third law $$m \cdot \frac{d}{dt} v = \sum_i F_i, \quad \text{(Eq. 1)}$$

wherein $F_i$ are the external and internal forces affecting the vehicle.

Figure 7:
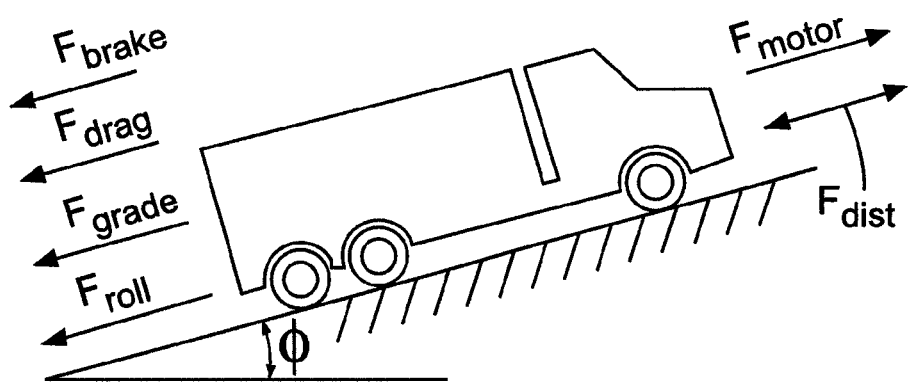
FIG. 7 is a graphic illustration of the forces which act on a vehicle traveling on an incline.

FIG. 7 illustrates a vehicle operated on an incline at a slope φ as well as the longitudinal forces that act on the motor vehicle. These forces include $F_{motor}$, the torque applied by the motor to a vehicle in response to fueling, plus the inertial forces on the vehicle. If the vehicle were backing up, the vector for $F_{motor}$ would be reversed. In addition, forces as a result of braking ($F_{brake}$) such as from service, engine and parking brakes (although parking brakes are not typically applied when the vehicle is being operated at speed) are indicated as a retarding force. Forces as a result of drag are indicated as a retarding force $F_{drag}$ in FIG. 7. If a strong enough tail wind is present, $F_{drag}$ would be significantly reduced. $F_{grade}$, arising from the slope is depicted as a retarding force, as the vehicle is heading uphill. $F_{grade}$ would be an accelerating force, pointed in the opposite direction, if the vehicle were travelling downhill. The disturbance force as indicated as $F_{dist}$ and can be either positive or negative, depending on vehicle operating conditions. The variations in drag force as a result of changing wind speeds and directions along the longitudinal direction and variations in rolling resistance forces can be included in $F_{dist}$, with a nominal value being included in, for example, $F_{drag}$. $F_{dist}$ can also account for the torque from selectively operating vehicle components, such as the vehicle fan, air compressors and the like, which turn on and off during vehicle operation. Combining these forces, the force balance at the vehicle center of mass can be expressed as follows (and ignoring $F_{dist}$):

$$Ma = m\frac{dv}{dt} = F_{motor} + F_{brake} + F_{drag} + F_{grade} + F_{roll} \quad \text{(Eq. 2)}$$

In the above equation, $F_{motor}$ is the force caused by the engine (e.g. the fueling force) or torque applied as a result of the engine being driven, less engine friction forces. $F_{brake}$ is a decelerating force by any brakes being applied. $F_{roll}$, assuming a nominal or initial value of the friction coefficient can expressed as $MgC_{rr}\cos\omega$, where m is the vehicle mass, g is the force of gravity, and $C_{rr}$ is the rolling friction coefficient, and φ is the grade of the street, measured in radians. In one approach, $C_{rr}$ can be assigned a nominal initial value (e.g. for dry pavement) with changes in rolling resistance forces being captured in $F_{dist}$. $F_{grade}$ is the forced caused by gravity and can be expressed as Mg sin φ. $F_{drag}$ corresponds to the force arising from turbulent friction (e.g. wind drag) and can be expressed as:

$$F_{drag} = -\frac{1}{2}C_w\rho_{air}Av^2$$

where $C_w$ is a characteristic shape coefficient for the particular vehicle being operated, $\rho_{air}$ is the density of the air, A is an approximation of the frontal surface area of the vehicle, and v is velocity of the vehicle plus or minus wind velocity in the longitudinal direction. The air density can be assigned a nominal (initial) value and the wind velocity can assume a nominal value (e.g. zero) to provide an initial $F_{drag}$ approximation. However, in reality, wind velocity and wind direction changes dynamically. Changes in drag due to changes in wind velocity in the longitudinal direction can be captured in $F_{dist}$. Thus, the use of a nominal value for wind velocity results in inaccuracies in characterizing the operation of the longitudinal dynamics of the vehicle.

In order to better account for changes in operating and environmental conditions, the vehicle disturbance force $F_{dist}$ is introduced into the equation. Thus, the equation as modified to include $F_{dist}$ can be expressed as follows:

$$Ma = m\frac{dv}{dt} = F_{motor} + F_{brake} + F_{drag} + F_{grade} + F_{roll} + F_{dist} \quad \text{(Eq. 2a)}$$

A more complete equation describing the longitudinal dynamics can be expressed as follows:

$$Ma = F_{fueling} - F_{engine\,friction} - F_{engine/service\,brake} - F_{Inertial} - F_{Drag} - F_{Roll} - F_{Grade} + F_{Dist} \quad \text{(Eq. 2a(1))}$$

In the above equation, $F_{motor}$ has been replaced by $F_{fueling}$ arising from torque due to vehicle engine operation, less engine friction (since engine friction will be a negative force). In addition, braking has been expressed as $-F_{engine/service\,brake}$ on the assumption the parking brakes are not being applied. $F_{Inertial}$ is the inertial forces that need to be overcome when operating the vehicle. The other components are expressed as explained above, with negative signs being used since these forces are normally negative. But again, the disturbance force $F_{dist}$ can be negative or positive, and although expressed as a positive in this formula, but $F_{dist}$ can be a negative value. The forces $F_{drag}$, $F_{grade}$, $F_{roll}$, and $F_{dist}$ have been discussed above. The equations for $F_{fueling}$ and $F_{engine\,friction}$ are set forth in Equations 2a(2) and 2a(3) below.

$$F_{fueling} = \eta k T_e \quad \text{(Eq. 2a(2))}$$

$$F_{engine\,friction} = f(\omega) \quad \text{(Eq. 2a(3))}$$

A further explanation of calculations that can be used to determine these forces is provided below.

The braking forces can be described as set forth in Eq. 2a(4) below.

$$F_{brake} = \eta k T_{enginebrake} + F_{servicebrake} \quad \text{(Eq. 2a(4))}$$

Again, this assumes parking brakes are not involved. As explained below, in desirable approaches, the vehicle disturbance estimates are not determined when braking forces are being applied and hence, these braking forces can be ignored when calculating vehicle disturbance estimates.

Eq. 2a(5), set forth below, describes the Inertial force:

$$F_{Inertial} = \eta J_{eng} k^2 a + \frac{J_{wheels}}{r_{wheels}^2} a \quad \text{(Eq. 2a(5))}$$

In the above equations, k can be determined as set forth in Eq. 2a(6) below:

$$k = \frac{\text{engine speed}}{\text{vehicle speed}} \approx \frac{n_{drive} n_{transmission}}{r_{wheels}} \quad \text{(Eq. 2a(6))}$$

Under no braking conditions, the braking force is eliminated from the Equation 2a(1). Also, assuming the gear is the top gear of the vehicle and the cruise control is active (hence the operator's operation of the throttle is not impacting the determination), the overall equation for longitudinal dynamic forces can be expressed as set forth in Eq. 2a(7) as follows:

$$\Rightarrow M\dot{v} = \eta k(T_e - T_{fric} - T_{aux}) - \left(\eta J_{eng} k^2 + \frac{J_{wheels}}{r_{wheels}^2}\right)\dot{v} - c_{drag}(v \pm v_w)^2 - Mg\sin\varphi - MgC_{rr}\cos\varphi + F_{dist} \quad \text{(Eq. 2a(7))}$$

In the above equation, $T_e$ is the torque from fueling the engine, $T_{fric}$ is the engine friction, $T_{aux}$ is the torque required to run auxiliaries that are on all the time (e.g. the vehicle alternator), the $F_{Inertial}$ force is included in the formula, the drag for $c_{drag}$ is included. Typically the vehicle velocity v is determined on an ongoing basis and a nominal (e.g. zero) value is assigned to wind speed $v_w$ [so $v \pm v_w = v$, so that changes arising from changes in $v_w$ are lumped into $F_{dist}$]. The forces due to grade and rolling resistance [$C_{rr}$ is typically assigned a nominal value with changes in rolling resistance forces due to changes in the coefficient of road resistance being captured in $F_{dist}$] are also included as well as the disturbance force. In the above equations, k is approximated by the engine speed divided by the vehicle speed; M is the mass of the vehicle (gross vehicle weight); η is the powertrain efficiency (available from engine specifications for a particular engine); $c_{drag}$ is addressed by the formula $\frac{1}{2} c_{air} A_L \rho$, and $\dot{v}$ is acceleration. Combining and simplifying the equations to provide an effective mass M on the left side of equation, results in Eq. 2a(8) set forth below:

$$\Leftrightarrow \underbrace{\left(M + \eta J_{eng} k^2 + \frac{J_{wheels}}{r_{wheels}^2}\right)}_{M_{eff}} \dot{v} = \underbrace{\eta k(T_e - T_{fric} - T_{aux}) - c_{drag}(v \pm v_w)^2 - Mg\sin\varphi - MgC_{rr}\cos\varphi}_{F_m} + F_{dist} \quad \text{(Eq. 2a(8))}$$

This equation can be simplified further, as set forth in Eq. 2a(9) below:

$$\Leftrightarrow M_{eff} \dot{v} = F_m + F_d \quad \text{(Eq. 2a(9))}$$

In the above equation, the longitudinal forces have been reduced to a disturbance force and all other forces.

In a particularly desirable embodiment, an average value of a disturbance force is determined by a VDE. In this embodiment, Eq. 2a is then modified as follows:

$$Ma = m\frac{dv}{dt} = F_{motor} + F_{brake} + F_{drag} + F_{grade} + F_{roll} + F_{avg\_dist} \quad \text{(Eq. 2b)}$$

$F_{avg\_dist}$ in the above equation is the output from this embodiment of the VDE. The vehicle disturbance estimates are determined from a plurality of inputs corresponding to vehicle parameters, vehicle operating parameters, and environmental parameters.

In the system equation (Eq. 2) there is no extra brake force considered. This is done since the partial derivatives of the system equation are presumed to exist. In order to take the decelerating effect of the brakes in account, the throttle pedal can be allowed to assume negative positions, and so the motor is capable of generating a decelerating torque. These negative throttle values can be converted to respective brake signals by an exemplary cruise controller such as the PCC system, as explained below.

The accelerating or decelerating force caused by the motor can be calculated by Eq. 3 from the engine torque.

$$F_{motor} = \eta \frac{i_D i_T}{r_w} T_{motor} \quad \text{(Eq. 3)}$$

where
- η is the effectiveness (powertrain efficiency) of the drive train.
- $i_T$ is the transmission coefficient.
- $i_D$ is the axle transmission coefficient.
- $r_w$ is the radius of the wheels.
- $T_{motor}$ is the applied torque by the engine.

The engine torque is composed of the decelerating or accelerating torque $T_{use}$ and the engine friction torque $T_{friction}$.

$$T_{motor} = T_{use} - T_{friction} \quad \text{(Eq. 4)}$$

Figure 8:
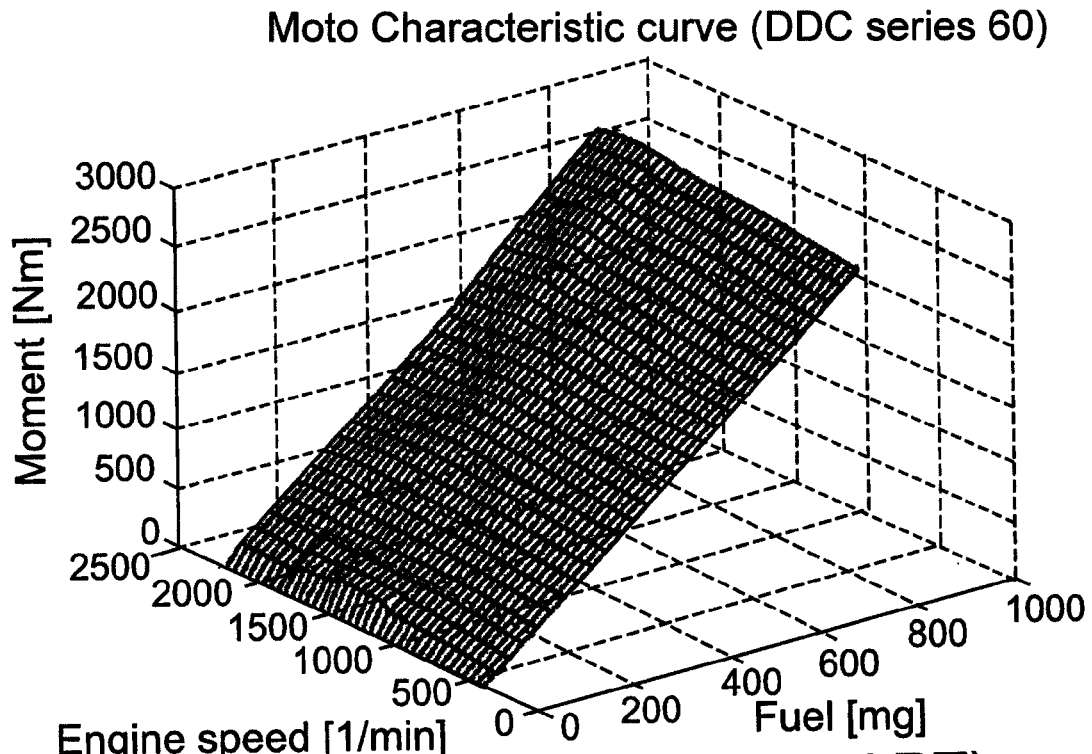
FIG. 8 is a graphic depiction of a look-up table defining an exemplary relationship between engine speed, fuel consumption and engine output torque.

$T_{use}$ can be determined, for example, by a motor look-up table, such as in FIG. 8, which shows engine torque in relation to engine speed n and fuel consumption per engine revolution measured in mg. The relation between the throttle pedal position th and the fuel value can be assumed to be static and linear. That is, $$\text{fuel} = \text{fuel}_{max} \cdot th \quad \text{(Eq. 5)}$$

where th ≤ 1 and $\text{fuel}_{max}$ is the maximum value of 'fuel' in the look-up table. As can be seen in FIG. 8, the look-up table can be approximated by a plane, as follows:

$$T_{use} = K_1 \cdot \text{fuel} + K_2 \cdot n + K_3. \quad \text{(Eq. 6)}$$

Figure 9:
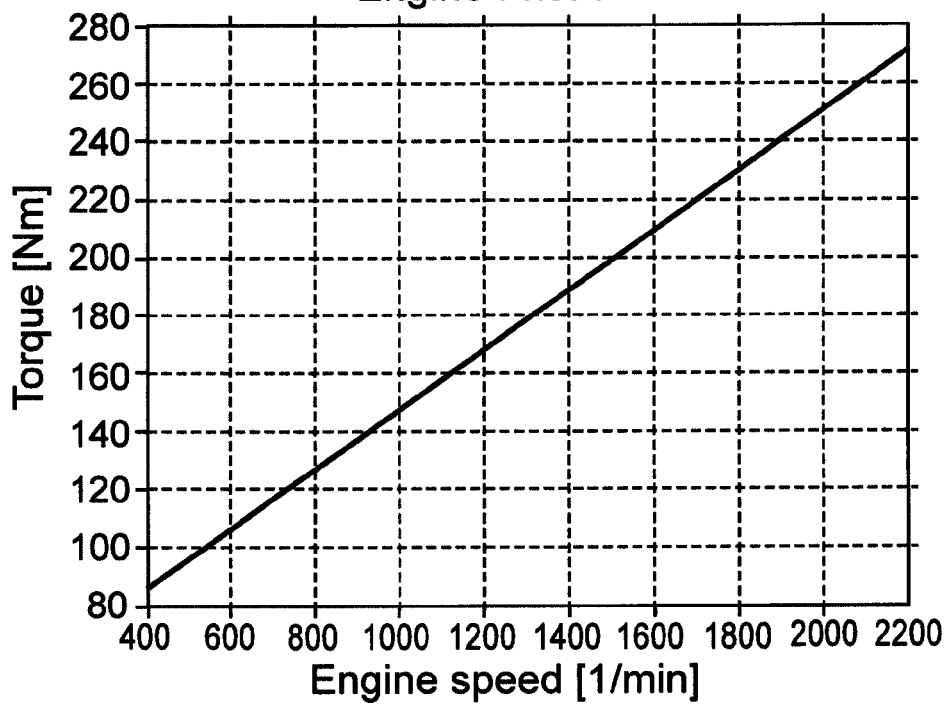
FIG. 9 is a graphic depiction an exemplary relationship between engine speed and engine friction.

Also the characteristic curve of the engine friction can be approximated by a straight line, as shown in FIG. 9. That is, the relationship between friction torque and engine speed is given by:

$$T_{friction} = R_1 \cdot n + R_2. \quad \text{(Eq. 7)}$$

And finally, the relation for the engine speed is:

$$n = 30 \frac{i_D i_T}{r_w \pi} v \quad \text{(Eq. 8)}$$

Combining Equations 4-8 yields the following expression for motor torque:

$$T_{motor} = K_1 \text{fuel}_{max} th + \frac{30 i_D i_T}{r_w \pi}(K_2 - R_1)v + K_3 - R_2. \quad \text{(Eq. 9)}$$

In accordance with an embodiment disclosed herein, a vehicle disturbance estimator (VDE) is provided for a motor vehicle. The motor vehicle comprises a cruise control, a plurality of gears, at least one brake, and a vehicle bus that carries plural signals corresponding to motor vehicle operating and environmental parameters. The vehicle disturbance estimator comprises: a microprocessor comprising first, second and third sets of inputs. The microprocessor can be a discrete microprocessor, dedicated to determining vehicle disturbance estimates. Alternatively, the microprocessor can be a non-dedicated microprocessor comprising a portion of a controller or microprocessor that exists on a vehicle. The first set of inputs comprises inputs corresponding to first parameters of the motor vehicle, the second set of inputs comprises inputs corresponding to second parameters of the motor vehicle, and the third set of inputs comprises inputs corresponding to the grade of the road being traveled by the motor vehicle. The microprocessor is operable to process the first, second and third sets of inputs to determine plural vehicle disturbance estimates for time periods during which the following conditions exist: the cruise control is on, the vehicle is being driven in the highest gear, and the vehicle is not being braked. The microprocessor produces output signals corresponding to the plural vehicle disturbance estimates, such as an average of a plurality of such disturbance estimates, with multiple averages desirably being provided. The vehicle disturbance estimates can be stored in memory, for use, for example, in controlling a cruise control, in vehicle diagnostics, or in connection with evaluating fuel economy testing of the vehicle.

Some of the inputs, and typically some or all of the second set of inputs comprise inputs that are available on a vehicle bus. It should be noted that the reference to inputs as first, second and third inputs is a matter of convenience, as the first set of inputs exist when all inputs in the specified first set are provided, the second set of inputs exist when all inputs in the specified second set of inputs are provided, and the third set of inputs exist when all inputs in the specified third set of inputs are provided, whether they are commingled, presented separately, or presented as discrete sets of inputs.

In one specific embodiment, the first set of inputs comprises inputs corresponding to the first parameters of the motor vehicle and environmental parameters, the first parameters comprising: gross vehicle mass; static wheel radius; nominal drag coefficient; nominal rolling resistance coefficient; and vehicle frontal area.

The above first set of inputs can be initially determined for a particular vehicle and operating conditions. The gross vehicle mass can be estimated by a conventional mass estimator and can be a measure of (and correspond to) the gross vehicle weight of the vehicle. If the vehicle includes a trailer being towed by the vehicle, the gross vehicle mass can, and desirably does, include the weight of the trailer. In addition, if the vehicle is loaded, the gross vehicle mass can include the weight of the load. This information can be entered, such as via a key pad, keyboard or other data entry device into the microprocessor. This can also be changed if the configuration of the vehicle is altered (e.g. the vehicle is no longer towing a trailer or has been unloaded). The static wheel radius is available from the vehicle specifications. The nominal drag coefficient can change with truck type and is available from truck specifications. For example, one such nominal value is 0.6. The nominal rolling resistance coefficient can correspond to a particular surface condition, such as dry asphalt. A nominal rolling resistance coefficient for dry asphalt is 0.005. The rolling resistance can change over time, depending upon the operating conditions of the vehicle. For example, operating a vehicle in heavy rain can increase the rolling resistance due to pumping of water by the rotation of vehicle tires. In contrast, operating the vehicle under light rain conditions can result in a lower rolling resistance. The rolling resistance can also change with tire tread depth and tire wear, as well as with changes in the friction on the road surface. Thus, the vehicle disturbance force, in one example, provides and indication of such changes, lumped with other contributions to the vehicle disturbance force. The vehicle frontal area is an approximation of the surface area of the vehicle (and any trailer) when one looks at the front of the vehicle. The frontal area can be viewed as an approximation of the area of the vehicle (collapsed in a vertical plane perpendicular to the longitudinal axes of the vehicle). The more accurate the value of the vehicle frontal area, the more accurate the determination of the vehicle disturbance force (for example, as a result of varying wind conditions). One approximation for the vehicle frontal area is the area of a trailer being towed by a vehicle, as typically the trailer is slightly wider and taller than the vehicle. In contrast, if no trailer is being towed, the frontal area of the tractor (in the case of a semi-tractor vehicle) can be used. The wheels can be excluded from the frontal area. Typically the area of the bumper of the vehicle is included. However, because the bumper area is small it can be eliminated without significant impact. The vehicle frontal area is a number that is available based on the vehicle type. As a specific example, 11.5 square meters is an exemplary frontal area for a trailer. Thus, this first parameter is met if a value is provided that corresponds to the vehicle frontal area, even if it is not an exact measurement of the frontal area.

In addition, the second set of inputs can correspond to a first set of second parameters of the vehicle. This first set of second parameters can comprise the: engine brake state; engine torque; engine speed; wheel based vehicle speed; and service brake state.

In the above parameters, the engine brake state corresponds to whether a Jake brake or other engine break is on or not and the service brake state corresponds to whether operator actuated brakes (e.g. controlled by a pedal) are being operated. If these brakes are being operated, the vehicle disturbance estimate is not computed, or if computed, is ignored. Information on the parking brake state is not needed because the parking brakes will not be on if the vehicle is in the top gear for a given vehicle speed. However, typically if parking brake information is provided and the parking brake is on, a vehicle disturbance estimate is not computed or is ignored. The engine torque corresponds to the torque produced by the engine and can be determined, such as explained below in connection with FIG. 8, from an engine reference torque table (or otherwise computed). The wheel based vehicle speed is the actual vehicle velocity as measured at the wheel and is a signal that is typically available on the vehicle bus.

The first set of inputs can also be expanded to include other groupings of first parameters. One such expanded set of first parameters includes the parameters mentioned above, together with a second set of first parameters comprising the engine and flywheel inertia; total wheel inertia; transmission efficiency per gear; and rear axle efficiency per gear. The engine and flywheel inertia and total wheel inertia are available from vehicle specifications and can be entered into the system as first parameters. These parameters are not required, even though they are desirable, because they can be set at zero. Similarly, the transmission efficiency per gear and rear axle efficiency per gear are available from truck specifications and, although desirable, are not essential as they can be set at 1, for example.

As yet another example, the first set of inputs can comprise inputs corresponding to an expanded third set of first parameters that further comprise: truck type; truck model; truck configuration; transmission type; rear axle type; tractor-trailer gap; tire pressure and temperature; wind direction and velocity; and road surface condition. The truck type and truck model information are available from truck specifications and can be used to compute a more precise coefficient of drag. The truck configuration (e.g. whether towing a trailer) can be used in refining the determination of the physical dimensions for the frontal area. The transmission type provides information on the number of gears (and hence, and indicator of the top gear) and whether the transmission is a manual transmission or an automatic transmission. The rear axle type parameter provides information on whether the vehicle is a tandem axle vehicle or a single-axle vehicle, which affects rear axle efficiency. This information can be used to compute a more precise determination of rear axle efficiency. The tractor-trailer gap parameter affects the drag coefficient and can be used to more precisely determine the coefficient. If not available, the drag coefficient can default to a nominal value. The tire pressure and temperature information can be used to provide a more precise estimate of the initial coefficient of rolling friction. Information on the wind direction and velocity can be used in computing the initial drag in the longitudinal direction. If not available, one can assume the wind velocity is zero, or some other nominal value. Information on the road surface condition can be used to help compute the initial coefficient of rolling friction. These last three parameters can be entered as initial values. These values typically change in real time. These impact changes can be captured in the vehicle disturbance estimates. Desirably, the first set of first parameters is a minimum set of parameters that is utilized. This first set of first parameters can be combined with one or both of the second and third sets of first parameters to provide enhanced vehicle disturbance estimates.

The second set of inputs can comprise inputs corresponding to an expanded second set of parameters in addition to the above-described first set of second parameters. This second set of second parameters can include the fan drive state and friction torque. The friction torque corresponds to the engine friction torque, as discussed above. The fan drive state corresponds to whether the fan is on or off. If the fan is on, the torque required to drive the fan reduces the amount of torque available for propelling the vehicle in a forward direction, and thus contributes to the vehicle disturbance estimate.

The second set of inputs can be expanded to comprise inputs corresponding to a third set of second parameters that further include: bunk blower fan state; cab blower fan state; air conditioning compressor state; non-driven wheel speed; transmission driveline engaged; engine percent load at current speed; transmission current gear; longitudinal acceleration; estimated engine parasitic losses—percent torque for fan and fuel pump; barometric pressure; and ambient air temperature.

In this third set of second parameters, the bunk blower fan state, cab blower fan state, and air conditioning compressor state all indicate whether these components are on or off. If on, the torque required to drive these components contributes to the vehicle disturbance estimate as this torque is not being used to propel the vehicle in a forward direction. These components contribute to a lesser extent to the vehicle disturbance estimate in comparison to whether the main vehicle fan is on or off. The non-driven wheel speed corresponds to a signal available from an ABS wheel speed sensor typically included in a vehicle and delivered to a vehicle bus. This signal can be used to double-check the vehicle speed signal being obtained separately from the vehicle bus. The transmission driveline engaged signal provides a double-check of, or way of, determining that a vehicle is in gear, as opposed to being shifted. If being shifted, the vehicle would not be in the top gear. The engine percent load at current speed signal, available on the vehicle bus, can be used to double-check the engine torque. The transmission current gear signal, available on the vehicle bus, can be used as an indicator as to whether the vehicle is in the top gear. However, this signal is not entirely reliable for this determination, as, during shifting, a typical approach is to broadcast the prior gear during the shifting operation until the next gear is reached. The longitudinal acceleration signal, available on the vehicle bus, can be used in determining the vehicle velocity. That is, vehicle velocity can, for example, be determined by taking a derivative of the wheel velocity. In contrast, to double-check the vehicle velocity or compute it in an alternative way, one can integrate the longitudinal acceleration value to provide the vehicle velocity. The estimated engine parasitic losses—percent torque for fan and fuel pump signals, available on the vehicle bus, provides an indication of the torque utilized by the fan and cooling pump of the vehicle when operated. The barometric pressure and ambient air temperature signals, also available on the vehicle bus, can be used to determine the density of the air, which affects the drag as the vehicle frontal area impacts the air.

As yet another example of an embodiment, the second set of inputs can be expanded to comprise inputs corresponding to a fourth set of second parameters that further comprise: the transmission shift in process; the transmission output shaft speed; and the transmission input shaft speed. In one approach, these three signals can be used to determine whether the vehicle is in the top gear. That is, the vehicle would not be in the top gear if the transmission shift is in process. If the transmission shift is not in process, the transmission output shaft speed and transmission input shaft speed indicate the gear that the vehicle is in, and thus the top gear, for example. The transmission shift in process signal can be used with the transmission current gear signal to determine whether the vehicle is in the top gear and whether a shift is occurring in an alternative approach.

As yet another example, the second set of inputs can be expanded to comprise inputs corresponding to a fifth set of second parameters that include the transmission actual gear ratio. This input can be used in determining whether the vehicle is in the top gear, in an alternative approach. The transmission actual gear ratio can alternatively be calculated from the engine speed and vehicle speed.

As another embodiment, the second set of inputs can be expanded to comprise inputs corresponding to a sixth set of second parameters that further comprise the clutch switch status or state. The clutch switch status or state is a signal available on the vehicle bus that indicates, in the case of a manual transmission, when a shift is occurring, and thus, the fact that the vehicle is not in the top gear. However, this signal is not entirely reliable as skilled drivers can shift a manual transmission vehicle from one gear to another without using the clutch.

As a further example, the second set of inputs can comprise inputs corresponding to a seventh set of second parameters that further comprise the windshield wiper state; transmission driveline engaged; transmission shift in process; transmission output shaft speed; transmission input shaft speed; transmission actual gear ratio; transmission current gear; the clutch switch state. The windshield wiper state (e.g. whether the windshield wiper is being used) is a signal available from the vehicle bus. If on, torque utilized to operate the windshield wiper has an impact on the vehicle disturbance estimate. However, this torque is relatively minimal compared to contributions of some other components. The transmission driveline engaged signal, available from the vehicle bus, provides yet another indication of whether the vehicle is in gear, as opposed to being shifted. The other signals in this particular set of second parameters corresponding second signals have been discussed above.

As yet another example, the second set of inputs can comprise inputs that are expanded to include an eighth set of second parameters that further comprise the fuel rate. The fuel rate can provide an indicator of unusual vehicle disturbance estimates (e.g. vehicle disturbance estimates above a threshold), as the fuel rate can exceed a desirable range or threshold if the vehicle disturbance estimates are high.

As noted previously, many of the parameters, and in particular many of the second parameters, can be taken from signals that are available on the vehicle bus. Alternatively, separate signals from sensors can be delivered to a microprocessor without utilizing the bus or in many cases the parameters can be calculated.

The third set of inputs corresponding to the grade of the road being traveled by the motor vehicle, includes inputs directly indicative of the grade of the road, as well as inputs from which the grade of the road can be computed. In one desirable approach, a GPS receiver on the vehicle receives a GPS signal from which the latitude and longitude of the vehicle (the position of the vehicle) is determined. This GPS signal can be provided on the vehicle bus to the microprocessor. The elevation information can be determined from, for example, a three dimensional (3-D) digital map. The grade information can be determined over a predictive horizon, such as described below. Alternatively, elevation information from plural GPS signals can be used in determining grade, as an alternative to using such information from a 3-D map. As another example, and less desirable than utilizing a predictive grade determination over a predictive horizon, an instantaneous grade sensor can be used in a conventional manner. Alternatively, the grade can be estimated based on vehicle operating parameters, such as the vehicle gear and the vehicle speed, but this tends to be less accurate (for example, if there is a strong headwind).

Desirably, signals corresponding to the first set of first parameters and the second set of second parameters (bus signals indicating the parameters directly, or from which the parameters can be computed) are provided to the microprocessor. To provide more accurate vehicle disturbance estimates, in addition to the signals corresponding to the first set of first parameters and the first set of second parameters, one or more of the second and third sets of signals corresponding to first parameters can be provided to the microprocessor, together with one or more of the second through seventh sets of signals corresponding to the second parameters. That is, the first set of first parameters and first set of second parameters can be supplemented by one or more additional parameters indicating signals for use in computing vehicle disturbance estimates.

Desirably, the microprocessor is operable to combine signals corresponding to plural vehicle disturbance estimates to provide a vehicle disturbance estimate output. For example these estimates can be combined in alternative manners, such as normal averaging, weighted averaging, or digital filtering. In a particularly desirable approach, the microprocessor is operable to average signals corresponding to the plural vehicle disturbance estimates to provide a vehicle disturbance signal output corresponding to an average of vehicle disturbance estimates over a plurality of sampling time periods. This output can be provided as an input to a cruise control, with the cruise control being operable to control the speed of the motor vehicle based in part on the output signals and thus, in part upon the average vehicle disturbance estimates.

The vehicle disturbance estimates can comprise a lump signal corresponding to plural forces acting upon the longitudinal axis of the motor vehicle. Particularly, in desirable examples, the plural forces correspond at least in part to lump contributions of rolling resistance forces and wind forces determined in real time. These plural forces can alternatively, or in addition, correspond at least in part to forces retarding the acceleration of the vehicle arising from the operation of one or more auxiliary components of the motor vehicle. These auxiliary components can comprise one or more of an engine cooling fan, cabin bunk blowers and a vehicle air conditioning compressor.

The following approach can be used to determine the vehicle disturbance estimates. The vehicle disturbance estimate algorithm can be run from time to time, such as periodically over a plurality of sampling time periods. For example, the VDE algorithm can be run and a vehicle disturbance estimate calculated every 40 milliseconds, when suitable conditions exist. In illustrated embodiments, the suitable conditions are the vehicle is in its top gear (e.g. gear 10 for a 10-speed truck); no service or engine brakes (or parking brakes) are being applied; and the cruise control of the vehicle is active (meaning that it is operating to control the speed of the vehicle).

Equations 2a(10) through 2a(19) illustrate the computation process.

Now let $$x_1 = v(t), x_2 = \frac{F_d(t)}{M_{eff}}, u_1 = \frac{F_m}{M_{eff}}, u_2 = 0. \quad \text{(Eq. 2a(10))}$$

$$x_2 \text{ can be modeled as } 1^{st} \text{ order} \Leftrightarrow \dot{x}_2(t) = -\omega_d x_2(t) + w_2 \quad \text{(Eq. 2a(11))}$$

$$\Leftrightarrow \dot{x}_1 = x_2 + u_1 \quad \text{(Eq. 2a(12))}$$

$$\dot{x}_2 = -\omega_d x_2 + w_2 \quad \text{(Eq. 2a(13))}$$

and $$y = x_1 + v \quad \text{(Eq. 2a(14))}$$

$$\Rightarrow \begin{bmatrix} \dot{x}_1 \\ \dot{x}_2 \end{bmatrix} = \begin{bmatrix} 0 & 1 \\ 0 & -\omega_d \end{bmatrix} \begin{bmatrix} x_1 \\ x_2 \end{bmatrix} + \begin{bmatrix} 1 & 0 \\ 0 & 0 \end{bmatrix} \begin{bmatrix} u_1 \\ u_2 \end{bmatrix} + \begin{bmatrix} 0 & 0 \\ 0 & 1 \end{bmatrix} \begin{bmatrix} w_1 \\ w_2 \end{bmatrix}, \quad \text{(Eq. 2a(15))}$$

$$y = \begin{bmatrix} 1 & 0 \end{bmatrix} \begin{bmatrix} x_1 \\ x_2 \end{bmatrix}$$

Using Euler's approximation:

$$\frac{x_1(t+1) - x_1(t)}{h} = x_2(t) + u_1(t) \quad x_1(t+1) = x_1(t) + hx_2(t) + hu_1(t) \quad \text{(Eq. 2a(16))}$$

$$\frac{x_2(t+1) - x_2(t)}{h} = -\omega_d x_2(t) + w_2 \quad x_2(t+1) = (1 - h\omega_d)x_2(t) + hw_2$$

$$\Rightarrow$$

$$\begin{bmatrix} x_1(t+1) \\ x_2(t+1) \end{bmatrix} = \underbrace{\begin{bmatrix} 1 & h \\ 0 & (1 - h\omega_d) \end{bmatrix}}_{A} \begin{bmatrix} x_1(t) \\ x_2(t) \end{bmatrix} + \underbrace{\begin{bmatrix} h & 0 \\ 0 & 0 \end{bmatrix}}_{B} \begin{bmatrix} u_1(t) \\ u_2(t) \end{bmatrix} + \underbrace{\begin{bmatrix} 0 & 0 \\ 0 & h \end{bmatrix}}_{G} \begin{bmatrix} w_1 \\ w_2 \end{bmatrix} \quad \text{(Eq. 2a(18))}$$

and $$y(t) = \underbrace{\begin{bmatrix} 1 & 0 \end{bmatrix}}_{C} \begin{bmatrix} x_1(t) \\ x_2(t) \end{bmatrix} + v \quad \text{(Eq. 2a(19))}$$

Kalman filtering can then be utilized in connection with this processing; although, as explained previously, other filtering techniques can be used in the alternative. A time-varying Kalman filter is a generalization of a steady-state Kalman filter for time-varying systems. Given the plant state and measurement equations set forth as Equations 2a(20) and 2a(21) below, and the equation for x(t) set forth in Eq. 2a(22) below, vehicle disturbance estimates can be calculated.

$$\Rightarrow \underline{x}(t+1) = A\underline{x}(t) + B\underline{u}(t) + G\underline{w}(t) \quad \text{(Eq. 2a(20))}$$

$$y(t) = C\underline{x}(t) + v(t) \quad \text{(Eq. 2a(21))}$$

where $$\underline{x}(t) = \begin{bmatrix} x_1(t) \\ x_2(t) \end{bmatrix} = \begin{bmatrix} v(t) \\ \dfrac{F_d(t)}{M_{\textit{eff}}} \end{bmatrix} \quad \text{(Eq. 2a(22))}$$

A time-varying Kalman filter is given by the recursions of Equations 2a(23) and 2a(24) below:

Measurement update:

$$\hat{x}[n|n] = \hat{x}[n|n-1] + M[n](y_v[n] - C\hat{x}[n|n-1])$$

$$M[n] = P[n|n-1]C^T(R[n] + CP[n|n-1]C^T)^{-1}$$

$$P[n|n] = (1 - M[n]C)P[n|n-1] \quad \text{(Eq. 2a(23))}$$

Time update:

$$\hat{x}[n+1|n] = A\hat{x}[n|n] + Bu[n]$$

$$P[n+1|n] = AP[n|n]A^T + GQ[n]G^T \quad \text{(Eq. 2a(24))}$$

$$Q[n] = E(w[n]w[n]^T)$$

$$R[n] = E(v[n]v[n]^T)$$

$$P[n|n] = E\{x[n] - x[n|n]\}\{x[n] - x[n|n]\}^T)$$

$$P[n|n-1] = E(\{x[n] - x[n|n-1]\}\{x[n] - x[n|n-1]\}^T)$$

In one specific exemplary approach, an embodiment of a VDE calculates the estimates for vehicle velocity and the disturbance force at sample intervals, such as every interval. Again, although not required, an exemplary sample interval is 40 milliseconds. These computations are made when suitable conditions exist as follows: the vehicle is in its top gear; no service or engine brakes (or parking brakes) are being applied; and the cruise control of the vehicle is active. The estimates of the disturbance force can be stored in memory, such as a buffer. An exemplary buffer has a size M. For example, M can be any desirable number of samples long, such as 2,000 samples. Once the buffer is full (or the desirable number of calculations have been made), an average of the disturbance force can be calculated based on the previous average disturbance force, such as follows:

$$F_{avgdist}(n) = \frac{\left(\dfrac{\sum \hat{F}_{dist}}{M} + F_{avgdist}(n-1)\right)}{2} \quad \text{(Eq. 2a(25))}$$

where
$F_{avgdist}(n)$—Current Average Disturbance Force (N)
$F_{avgdist}(n-1)$—Previous Average Disturbance Force (N)
$\hat{F}_{dist}$—Estimated Disturbance Force (N)
M—Number of Samples It should be noted that averaging disturbance estimates is one desirable approach that can be used.

In addition, samples can be weighted, such as giving more weigh to more recently determined averages, to more quickly account for changes in vehicle operating parameters and operating conditions. As a specific example, weighting factors $W_1$ and $W_2$ can be employed as set forth in Eq. 2a(26) below:

$$F_{avg\_dist}(n) = \frac{\left(\dfrac{W_1 \times \sum \hat{F}_{dist}}{M} + W_2 \times F_{avg\_dist}(n-1)\right)}{2} \quad \text{(Eq. 2a(26))}$$

In the above equation, if $W_1$ and $W_2$ are not used, they can simply be set to 1. Typically, the sum of $W_1$ and $W_2$ is equal to 1. In addition, typically, $W_1$ is greater than $W_2$, so that more weight is given to recent vehicle disturbance estimates than prior vehicle disturbance estimates. As a specific example, $W_1$ can be 0.7 and $W_2$ can be 0.3.

Vehicle disturbance estimates can be used in diagnosing motor vehicle performance. For example, vehicle disturbance estimates exceeding a threshold provide an indication of, if unexplained, for example, by a strong headwind or road surface conditions, for example, a faulty auxiliary component or operation thereof In addition, excessive or high vehicle disturbance estimates (exceeding a threshold) over a portion of a route in comparison to another portion of a route, or over a first run by a vehicle in comparison to a later run of the first route by a vehicle, provides an indication that the vehicle operation was affected by external parameters. If the difference exceeds a threshold, the results of a fuel efficiency test run for times where the vehicle disturbance estimate exceeds a threshold can be discarded as being atypical.

Example Cruise Control with VDE

As explained below, the vehicle disturbance estimate, for example the $F_{avg\_dist}(n)$, the current average disturbance force, can be delivered as an output from the vehicle disturbance estimator and used to update a cruise control vehicle model before optimization. In the event a cruise control is not active, the particular average disturbance estimate can be reset to zero, to allow restarting of the disturbance estimate when the cruise control is again engaged and active.

The output of the vehicle VDE can be used by a cruise control, such as of the type described in U.S. Pat. No. 6,990,401 to Neiss et al. This latter system, a predictive cruise control (PCC) uses information about the current vehicle position, and upcoming terrain. In the approach disclosed in the Neiss et al. patent, a vehicle operating cost function is defined, based on a plurality of environmental parameters, vehicle parameters, vehicle operating parameters and route parameters. The PCC optimization is based on a vehicle longitudinal model which is enhanced by the VDE system.

The VDE is not limited to use with the PCC system, as it can be used as an input to other cruise controls, using algorithms relating to the longitudinal dynamics of the vehicle operation. In addition, the VDE is not limited to a cruise control based upon computing a cost function in its operation. However, the PCC cruise control in combination with a VDE, with the VDE providing an input to the PCC, is a particularly desirable embodiment.

Figure 1:
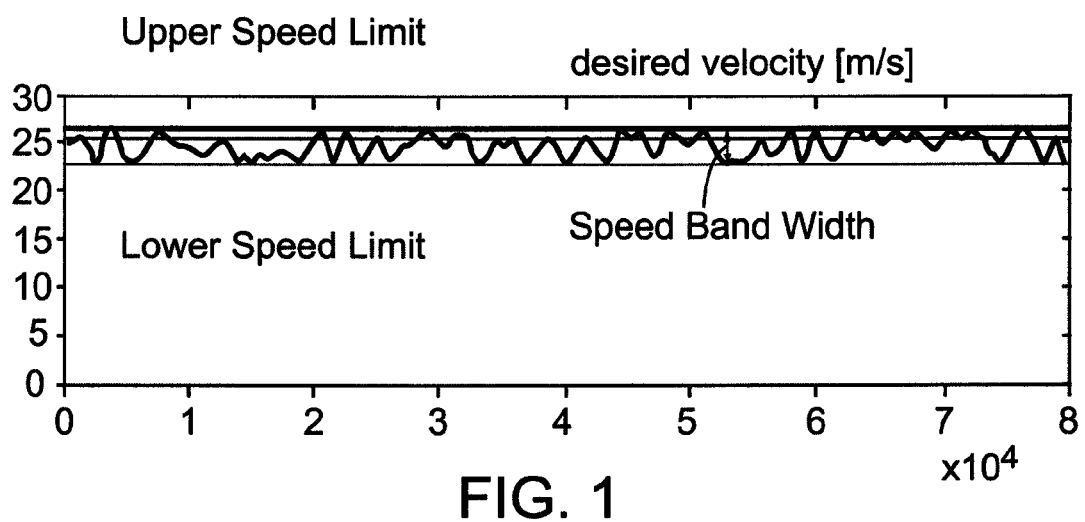
FIG. 1 is a graphic illustration of an exemplary cruise control system that can be used with a vehicle disturbance estimator.
Figure 2:
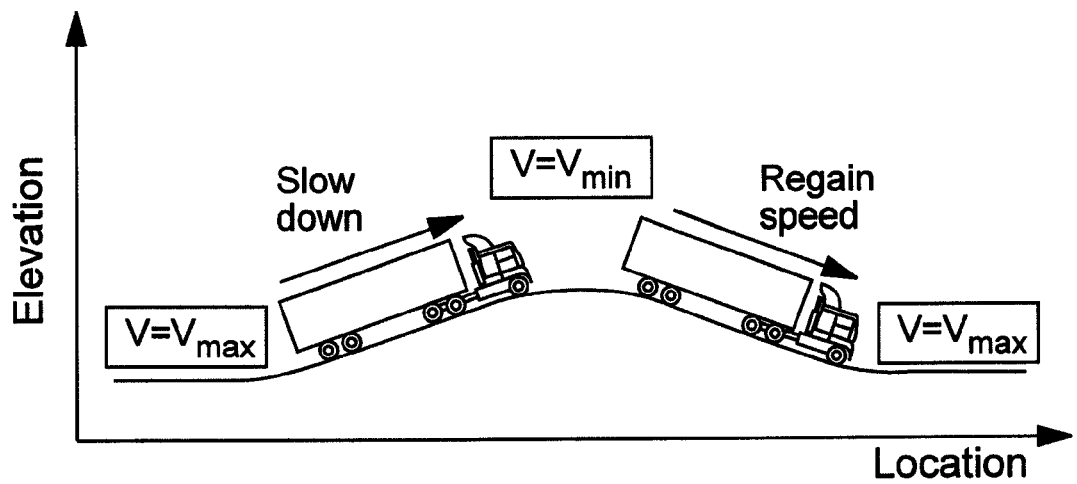
FIG. 2 is a graphic depiction of a vehicle traveling over a hill.

The basic idea of Predictive Cruise Control (PCC) is to replace or supplement the set speed of a conventional cruise control with a speed band. Forward-looking terrain information can be used to determine, as a function of position, a desired speed inside the speed band (as shown in FIG. 1 for example), in order to maximize fuel savings. In the ideal case, the vehicle that is equipped with PCC slows down as it moves uphill until it reaches a minimum speed on top of the hill, and regains speed on the downhill slope, thus completely converting the potential energy into kinetic energy. (See FIG. 2.) This strategy prevents unnecessary braking, or delays braking until it is unavoidable.

In many cases, although not in all cases, the combination of a VDE with a PCC system resulted in fuel savings when tested in a vehicle. For example, in a strong headwind, as when the vehicle travels along an uphill grade, the VDE signal would be used by the PCC to increase the fuel delivered to a vehicle to maintain the vehicle's speed within the band, despite the existence of the headwind. Also, a tighter band can result.

Figure 3:
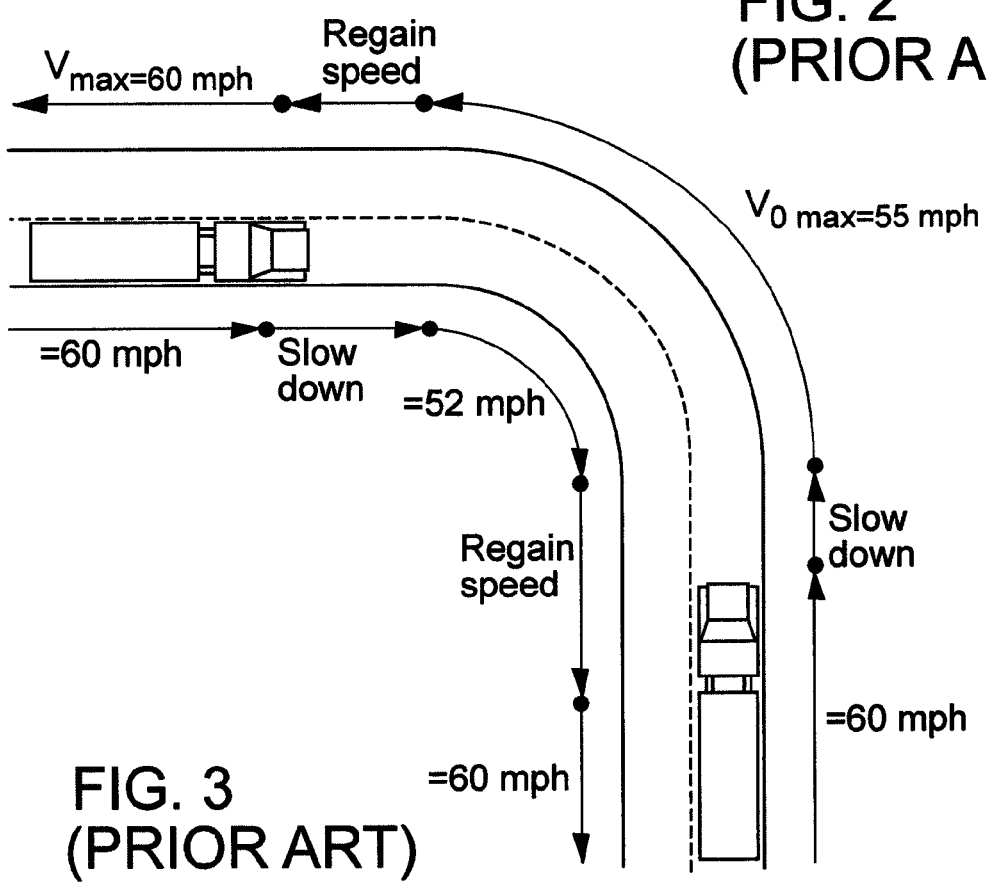
FIG. 3 is a graphic depiction of vehicles traveling in a curve.

In addition, road curvature information can also be used to reduce vehicle speed in curves in order to avoid high lateral acceleration which can lead to vehicle rollover. As the vehicle approaches a curve, the speed can automatically be reduced as shown in FIG. 3. The vehicle disturbance estimates can also be used to adjust to changes in vehicle speed when going around a corner. For example, in the face of a strong headwind, the headwind will tend to slow the vehicle down faster than would be the case if the headwind were not included in the vehicle disturbance estimate.

A block diagram of an exemplary PCC vehicle control system is shown in FIG. 4. This illustrated system includes a conventional controller 102, which may (but need not) be a closed loop cruise control system in which the throttle of the vehicle 104 is controlled based on an error signal between actual and desired vehicle speed. Such systems are well known, as discussed below in regard to FIG. 5. In addition, the illustrated system also includes a PCC block 106, that receives the following inputs:

GPS: The Global Positioning System 110 supplies the PCC block 106 at input 112 with information about the current position of the vehicle (e.g. the latitude and longitude). The GPS system can also provide elevation information.

Current Velocity: The current vehicle velocity is supplied at input 114 and can be used to estimate the current vehicle position if no GPS signal is available, and also can be used to update the desired vehicle speed.

Algorithm Parameters/Map: Algorithm parameters, such as from a vehicle bus or entered into the system and stored in memory can be provided at input 130 to PCC block 106. Also, map data, such as elevation information from a 3-D map database corresponding to the vehicle's position (and to a predictive horizon) can also be provided (e.g. from memory or a map database) to the PCC block 106 via input 130.

Vehicle Disturbance Estimates: Vehicle disturbance estimates from a VDE 200 are delivered to PCC block 106 at input 118. The vehicle disturbance estimates in one example are values equal to calculated average estimated disturbance forces.

In turn, the PCC block generates as outputs:

Desired Velocity $V_{desired}$ at output 120.

Desired Throttle: The Throttle Pedal Position controls the fuel injection to the motor. This output (at 122) can take on negative values if the PCC system requests a deceleration of the vehicle.

Controller Gain: If a linear controller is utilized to allow the vehicle to follow the optimal velocity trajectories, this PCC output (at 124) supplies the appropriate optimal gain value.

All these output signals are inputs for the controller 102 which controls the vehicle to follow the calculated velocity trajectory.

It should be noted in this regard that there are many ways in which the desired vehicle velocity can be realized by the controller, but they are all fundamentally the same. Eventually a command signal is typically given to the engine so that it attempts to achieve the desired speed. This command is referred to herein as the "throttle position". In reality, the command need not be a true throttle position. In its most general sense the process is: the desired vehicle speed is converted to a desired engine speed, which is sent to the engine and the engine achieves it via its own controller or using a separate adaptive cruise controller. In the case of a diesel engine, the engine determines how much fuel to inject. (The amount of fuel injected can be mapped to a pedal or throttle position, which is why it is referred to in this way.) On the other hand, if the system is implemented with a gasoline engine, the command could actually be a throttle angle.

The illustrated Vehicle Disturbance Estimator 200 comprises a microprocessor 206 programmed to compute vehicle disturbance estimates as previously described. In this example, a GPS signal from GPS system 110 is delivered via input 212 to the VDE 200. In addition, a map signal (e.g. from a 3-D map database containing elevation information, for example) is delivered at input 210 to the VDE. The parameters required by the VDE to compute the vehicle disturbance estimates are delivered via inputs 214 from a source illustrated as parameters 220 in FIG. 4. These parameters can be entered by a data entry device 222 (e.g. by a keyboard, touch screen, tablet or other data entry device). The parameters may alternatively be delivered directly (after conditioning for suitable levels for processing by the microprocessor 206), from various parameter sensors indicated at 224. Alternatively, signals corresponding to parameters available on the vehicle bus 230, can be delivered to the microprocessor 206. As yet another alternative, the parameters can be computed from other available data, such as indicated by block 225 (which can be included in the microprocessor). In the specific example illustrated in FIG. 4, the VDE 200 provides an output at line 118 corresponding to $F_{avg\_dist}$. The $F_{avg\_dist}$ signals are used by the PCC algorithm to control the cruise control system at least in part (the other factors involved in cruise control still playing a part of the overall cruise control system).

FIG. 5 shows a linear controller of a type that can be included in the system of FIG. 4. In the subtraction unit 140, the actual vehicle speed $v_{act}$ (from input 142) is compared with the desired speed $v_{des}$ (from input 120) and multiplied by the input controller gain in a multiplier unit 144, to generate a throttle error signal Δth. The latter signal is then added to a desired throttle input in an adder 150 to generate a throttle signal th, that is applied to vehicle throttle and braking characteristics 152, 154, which are used to control the vehicle throttle and brakes.

In practice, the functionality of the linear controller represented by block 102 in FIG. 4 may already be present in the vehicle so that a set speed determined in the PCC block 106 is provided to the vehicle, which applies it using its own control algorithms implemented by its own engine controller.

Figure 6:
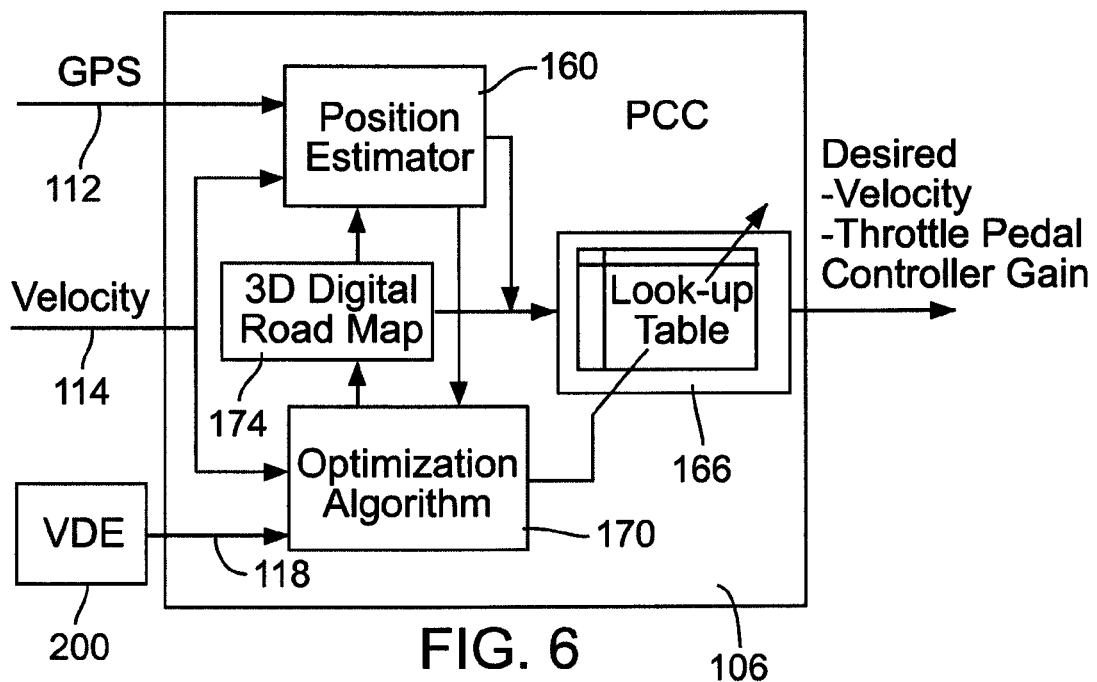
FIG. 6 is a block diagram which illustrates an exemplary cruise control module receiving an input from a vehicle disturbance estimator.

The basic structure of an exemplary PCC block 106 with a vehicle disturbance estimator 200 is shown in FIG. 6. Apart from the VDE, the illustrated block 106 can comprise four basic modules:

Position Estimator 160: This module (which may be present in the vehicle navigation system) determines the current position of the vehicle on the road, such as by integrating the vehicle velocity and taking into account the incoming GPS messages.

Look-up Table 166: The illustrated look-up table can comprise a memory where desired velocity, throttle pedal, and controller gain values can be stored for an area (the Prediction Horizon) around the current vehicle position. The outputs of the PCC block 106 can be determined by reading out the values belonging to the vehicle position supplied by the Position Estimator.

Optimization Algorithm Module 120: This is the main module, in which optimal velocity trajectory, the optimal throttle pedal positions, and the controller gains are calculated for the approaching road within the Prediction Horizon. Thus, optimization desirably is based on optimization of a cost function, one example of which is described hereinafter. These series can then be stored in the look-up table. The start of a new calculation can be triggered every time the vehicle has covered a specified distance. Alternatively, the start of a new calculation can be triggered by other events, such as the vehicle driver changing a set vehicle speed.

3D Digital Road Map 174: The Optimization Algorithm (an example of which is described hereinafter) can use information read from the digital map to determine the gradient angles and curve radii of the upcoming road; and the Position Estimator module 160 can use information about the area surrounding the current position to determine the most likely position on the road for a new GPS message to initialize its integrator.

Apart from $F_{dist}$, a combination of Equations 2-9 together in the motion equation (Eq. 1), results in the following equation:

$$m \frac{d}{dt} v(t) = \qquad \text{(Eq. 10)}$$

$$\frac{30 \eta i_D^2 i_T^2 (K_2 - R_1)}{r_w^2 \pi} v + \frac{\eta i_D i_T (K_1 fuel_{max} th + K_3 - R_2)}{r_w} -$$

$$1/2 c_w \rho A v^2 - m\mu g \cos(\phi) - mg \sin(\phi).$$

In accordance with this disclosure, in an embodiment where the average disturbance force is utilized, Eq. 10 can be modified as set forth in Eq. 10a below:

$$m \frac{d}{dt} v(t) = \qquad \text{(Eq. 10a)}$$

$$\frac{30 \eta i_D^2 i_T^2 (K_2 - R_1)}{r_w^2 \pi} v + \frac{\eta i_D i_T (K_1 fuel_{max} th + K_3 - R_2)}{r_w} -$$

$$1/2 c_w \rho A v^2 - m\mu g \cos(\phi) - mg \sin(\phi) + F_{avg\_dist}$$

It is convenient to change Eq. 10 such that it is differentiated with respect to distance rather than time. This is achieved with the substitution:

$$dt = \frac{1}{v} ds, \qquad \text{(Eq. 11)}$$

where s is the driven distance from a specified start point on the current street. Applying Eq. 11 to Eq. 10 (and apart from $F_{dist}$):

$$\frac{d}{ds} v(s) = \underbrace{\frac{c_w \rho A}{2m}}_{=: A_1} \cdot v(s) + \underbrace{\frac{30 \eta i_T^2 i_D^2 (K_2 - R_1)}{mr_w^2 \pi}}_{=: A_2} + \qquad \text{(Eq. 12)}$$

$$\underbrace{\frac{\eta i_T i_D (K_3 - R_2) - r_w mg(\mu \cos\varphi(s) + \sin\varphi(s))}{mr_w}}_{=: A_3(s)} \cdot \frac{1}{v} +$$

$$\underbrace{\frac{\eta i_T i_D fuel_{max} K_1}{mr_w}}_{=: B} \cdot \frac{th}{v}$$

In the embodiment where the $F_{avg\_dist}$ force is addressed, Eq. 12 can be modified as set forth below in Eq. 12a:

$$\frac{d}{ds} v(s) = \underbrace{\frac{c_w \rho A}{2m}}_{=: A_1} \cdot v(s) + \underbrace{\frac{30 \eta i_T^2 i_D^2 (K_2 - R_1)}{mr_w^2 \pi}}_{=: A_2} + \qquad \text{(Eq. 12a)}$$

$$\underbrace{\frac{\eta i_T i_D (K_3 - R_2) - r_w mg(\mu \cos\varphi(s) + \sin\varphi(s)) + r_w F_{avg\_dist}}{mr_w}}_{=: A_3(s)} \cdot \frac{1}{v} +$$

$$\underbrace{\frac{\eta i_T i_D fuel_{max} K_1}{mr_w}}_{=: B} \cdot \frac{th}{v}$$

With the position independent coefficients $A_1$, $A_2$ B and the position dependent coefficient $A_3$ (S), the system equation becomes $$\frac{d}{ds} v(s) = A_1 v + A_2 + A_3(s) \frac{1}{v} + \frac{B}{v} th \qquad \text{(Eq. 13)}$$

$$= f(s, v(s), th(s)).$$

In practice application, a discrete model is needed. This can be obtained, for example, by Euler approximation, $$v(s_{k+1}) = v(s_k) + \int_{s_k}^{s_{k+1}} f(s, v(s), th(s)) \qquad \text{(Eq. 14)}$$

$$\approx v(s_k) + \underbrace{(s_{k+1} - s_k)}_{=h} \cdot f(s_k, v(s_k), th(s_k))$$

$$v(s_{k+1}) = v(s_k) + h \cdot f(s_k, v(s_k), th(s_k)).$$

where the constant h is called the Integration Step Size.

Exemplary Cost Function

If a PCC system is to be controlled in an 'optimal' manner, it is first necessary to define what optimal means. Usually in optimal control theory a "cost" function is defined. A system is later called optimal if the calculated control sequence minimizes the cost function. The cost function should be chosen in order to let the system behave in a desired way. Accordingly, for the purpose of an exemplary Predictive Cruise Control according to an embodiment, the following goals can be used to define "optimal operation":

The vehicle should consume less fuel and should activate the brakes as little as possible. The vehicle should attempt to maintain a specified velocity (Set Speed).

The vehicle's velocity should neither exceed an upper limit nor undershoot a lower velocity limit.

The total travel time should be minimized.

The lateral acceleration while driving in curves should not be so high as to impair driving comfort and safety.

It should be possible to stress the different aspects mentioned above individually.

These demands can be expressed in an analytic cost function, together with the further requirements that the mathematical expression for the cost function should be:

Differentiable to calculate a "stationary" point at which its slope is zero (min/max point); and Easy for a computer to process.

Hereinafter, exemplary discrete expressions for the individual demands are derived.

Fuel and Braking

As mentioned previously, the brakes are considered by allowing 'negative' throttle pedal positions. Negative throttle values th can be taken into consideration in deriving a characteristic expression for the fuel consumption and the brake activity. The fuel consumption per second can be calculated by $$Q(t) = \underbrace{\frac{fuel_{max} i_D i_T}{2 \cdot 10^6 \pi r_W \rho_{fuel}}}_{=: \sqrt{\psi}} \cdot v(t) \cdot th(t) \tag{Eq. 15}$$

where $\rho_{fuel}$ is the density of the fuel $\left( \text{measured in } \frac{\text{kg}}{\text{m}^3} \right)$.

Since negative values for the throttle pedal position also occur, one possible expression for the cost function is $$J_{fuel} = \frac{1}{2} \int_0^{\tau} SQ^2 \, dt, \tag{Eq. 16}$$

where S is a constant weighting factor. Substituting Equations 11 and 15 into Equation 16 yields:

$$J_{fuel} = \frac{1}{2} \int_0^{\tau} S\psi v t h^2 \, ds, \tag{Eq. 17}$$

For discrete computations, the integral can be replaced by a summation, which can be achieved by the Euler approximation.

$$J_{fuel} = \frac{1}{2} \cdot h \cdot \sum_{k=0}^{N-1} S\psi v_k th_k^2, \tag{Eq. 18}$$

where N is the number of base points in the considered prediction horizon and $h = S_{k+1} - S_k$ is the Integration Step Size.

Set Speed

To reduce drifts from the desired Set Speed, $V_{desired}$, a term for the cost function is $$J_{velocity} = \frac{1}{2} \int_{x_0}^{x} q(v - v_{desired})^2 \, ds \tag{Eq. 19}$$

where q is also a constant factor which determines the weight of the collective cost function. Again, adapting this or discrete computation yields:

$$J_{velocity} = \frac{1}{2} \cdot h \cdot \sum_{k=0}^{N-1} q(v - v_{desired})^2 \tag{Eq. 20}$$

Lower Velocity Limit

Since the objective is to keep the velocity within certain limits, a cost function term is defined to penalize exceeding the velocity. Equation 21 shows such a penalty function:

$$J_{penalty} = \frac{1}{2} \cdot \sum_{k=0}^{N-1} (\Gamma_1 (v_{lower} - v)^2 \sigma(v_{lower} - v) + \Gamma_2 (v - v_{upper})^2 \sigma(v - v_{upper})) \tag{Eq. 21}$$

Here $\Gamma_{1/2}$ are constant weighting factors. These values are in respect to the other weighting factors to make the velocity remain between the lower velocity limit, $V_{lower}$, and the upper velocity limit $V_{upper}$. $\sigma(\xi)$ is defined as $$\sigma(\xi) = \begin{cases} 1 & \xi \geq 0 \\ 0 & \xi < 0 \end{cases} \tag{Eq. 22}$$

Travel Time

The total travel time is calculated by $$T_{total} = \int_0^{\tau} dt \tag{Eq. 23}$$

By changing the total differential, and applying the Euler approximation this can be expressed as $$T_{total} = \int_{x_0}^{x} \frac{1}{v} dx \tag{Eq. 24}$$
$$\approx \sum_{k=0}^{N-1} \frac{h}{v}$$

Thus, a term considering the total travel time in the cost function is $$J_{time} = \sum_{k=0}^{N-1} \frac{hT}{v} \tag{Eq. 25}$$

where T is the weighting factor.

Lateral Acceleration

To maintain comfort and safety while driving through the lateral acceleration of the vehicle should remain predetermined value which is considered safe. The steady state lateral acceleration of the vehicle in the plane of the road can be approximated by:

$$\alpha_{lateral} = v^2 \cdot c(s) - g \sin \Theta(s)$$

For small values of $\Theta$, $\sin \Theta \approx \Theta$. Therefore, this expression may be simplified as follows:

$$\alpha_{lateral} = v^2 \cdot c(s) - g \cdot \theta(s) \tag{Eq. 26}$$

where
- c is the curvature of the road (inverse of the radius) at distance s along the road;
- g is the acceleration due to gravity; and
- θ is the cross-slope or superelevation of the road at distance s along the road A cost function which attempts to keep the lateral acceleration maximum value is:

$$J_{lateral\_accel} = \frac{1}{2} \cdot h \cdot R \cdot \sum_{k=0}^{N-1} (v_k^2 \cdot c_k - g \cdot \Theta_k - a_{max})^2 \cdot \sigma(v_k^2 \cdot c_k - g \cdot \Theta_k - a_{max}) \quad \text{(Eq. 27)}$$

where:
R is a constant weighting factor;
σ is defined in Eq. 22;
and $a_{max}$ is the predefined maximum acceptable lateral acceleration.

Final State Cost Function

If the final state is not fixed, an additional cost function is desirably defined for it.

$$\Phi = \frac{1}{2} M(v_N - v_{desired})^2 \quad \text{(Eq. 28)}$$

M is again a constant weighting factor. It should not be chosen to be so small that numerical difficulties are encountered in further calculations.

The Discrete Cost Function

The cost function is formed by combining the preceding results in a manner which depends on the response which it is desired to control. For example, a system which takes all of the above factors into account can be defined by the equation:

$$J = \Phi + J_{time} + J_{fuel} + J_{velocity} + J_{lateral\_accel} + J_{penalty}$$

Using this formulation results in the following expression for the cost function J, which is used in the minimization analysis hereinbelow:

(Eq. 29)
$$J = \frac{1}{2} M(v_N - v_{desired})^2 + \sum_{k=0}^{N-1} \left\{ hT\frac{1}{v_k} + \frac{1}{2} hS\phi v_k th_k^2 + \frac{1}{2} qh(v_k - v_{desired})^2 + \right.$$

$$\frac{1}{2} \cdot h \cdot R \sum_{k=0}^{N-1} (v_k^2 \cdot c_k - g \cdot \Theta_k - a_{max})^2 \cdot \sigma(v_k^2 \cdot c_k - g \cdot \Theta_k - a_{max}) +$$

$$\left. \underbrace{\frac{1}{2} \Gamma_1 (v_{lower} - v_k)^2 \sigma(v_{lower} - v_k) + \Gamma_2 (v_k - v_{upper})^2 \sigma(v_k - v_{upper})}_{=:L} \right\}$$

On the other hand, it is also possible, to control the system response in other ways simply by zeroing out (that is, applying a zero coefficient to) some of the terms. For example, for predictive cruise control focusing on fuel savings due to elevation changes (without taking into account lateral acceleration), the cost function can be given by:

$$J = \Phi + J_{time} + J_{fuel} + J_{velocity} + J_{penalty}.$$

On the other hand, the cost function implemented for focusing on rollover prevention can be:

$$J = \Phi + J_{fuel} + J_{velocity} + J_{lateral\_accel}$$

with each of the above terms being given by the expressions derived previously.

Minimization of the Cost Function

Considering both the cost function J, and the vehicle model of Equation 14, in order to minimize vehicle operating "costs" (as defined), it is necessary to calculate a sequence of control values $th_k$ (k=0 . . . N−1) so that the cost function:

$$J = \Phi(v_N) + \sum_{k=0}^{N-1} L(s_k, v(s_k), th(s_k)) \to \min \quad \text{(Eq. 30)}$$

while keeping the equality constraints $$v(s_{k+1}) = f(s_k, v(s_k), th(s_k)) \quad \text{(Eq. 31)}$$

and $$v(s_0) = v_0 (\text{initial velocity}) \quad \text{(Eq. 32)}$$

For the purpose of the analysis which follows, $v_k = v(x_k)$, $th_k = th(x_k)$ and $\phi_k$ is just set to φ.

Optimization problems with equality constraints are frequently solved by means of the Lagrangian multiplier, which can be understood as follows: Assume a function h(x,y), where x and y are constrained by g(x,y)=0. Adding g multiplied by a scalar factor λ to h yields a new function L(x,y,λ)=f(x,y)+λg(x,y). L and h have the same minimum value since this is not changed by adding zero. (g(x,y)=0.) So a stationary point (slope=0) of L is also a stationary point of h, and the constraints are kept since $$\frac{\partial L}{\partial \lambda} = g(x, y) = 0.$$

Defining for every equality constraint a Lagrangian multiplier, and adding it to the cost function J results in the following expression:

$$J = \quad \text{(Eq. 33)}$$

$$\Phi(v_N) + \sum_{k=0}^{N-1} (L(x_k, v(x_k), th(x_k)) + \lambda_{k+1}\{f(x_k, v_x, th_k) - v_{k+1}\})$$

It is useful to define a scalar sequence $H_k$:

$$H_k(x_k, v_k, th_k, \lambda_{k+1}) = L(x_k, v_k, th_k) + \lambda_{k+1} f(x_k, v_k, th_k) \quad \text{(Eq. 34)}$$

Changing indices of summation on the last term in Eq. 33, $$J = \Phi(v_N) - \lambda_N v_N + \sum_{k=1}^{N-1} (H_k - \lambda_k v_k) + H_0 \quad \text{(Eq. 35)}$$

In order to obtain a stationary point the first derivative δJ of the cost function must be equal to zero.

$$\delta J = \sum_{k=0}^{N-1} \frac{\partial J}{\partial v_k} \delta v_k + \sum_{k=0}^{N-1} \frac{\partial J}{\partial th_k} \delta th_k + \sum_{k=0}^{N-1} \frac{\partial J}{\partial \lambda_{k+1}} \delta \lambda_{k+1} \quad \text{(Eq. 36)}$$

$$= 0$$

After calculating the partial derivatives we get $$\delta J = \left[\frac{\partial \Phi}{\partial v_N} - \lambda_N\right]\delta v_N + \sum_{k=1}^{N-1}\left\{\left[\frac{\partial H_k}{\partial v_k} - \lambda_k\right]\delta v_k + \frac{\partial H_k}{\partial th_k}\delta th_k\right\} + \frac{\partial H_0}{\partial v_0}\delta v_0 + \frac{\partial H_0}{\partial th_0}\delta th_0 + \sum_{k=0}^{N-1}\left[\frac{\partial H_k}{\partial \lambda_{k+1}} - x_{k+1}\right]\delta\lambda_{k+1} \quad \text{(Eq. 37)}$$

Since the initial velocity is determined by Eq. 32, the derivative $\delta v_O$ vanishes. The derivative $\delta J$ vanishes for all possible variations in the state variable, $\delta v_k$ in the control variable $\delta th_k$, and in the Lagrangian multiplier $\delta\lambda_{k+1}$ if:

1. $\lambda_k = \frac{\partial H_k}{\partial v_k}, k = 0 \ldots N-1$ (Eq. 38)

2. $v(k+1) = \frac{\partial H_k}{\partial \lambda_{k+1}}, k = 0 \ldots N-1$ (Eq. 39)

3. $\frac{\partial H_k}{\partial th_k} = 0, k = 0 \ldots N-1$ (Eq. 40)

4. $\lambda_N = \frac{\partial \Phi(N)}{\partial v_N}$ (Eq. 41)

5. $v(x_0) = v_0$ (Eq. 42)

Such problems are called two-point boundary-value problems. Since this kind of problem can't usually be solved analytically, it is desirable to apply numerical methods. For this purpose, a second-order gradient algorithm can be chosen.

The advantages of this algorithm are:

The results of every iteration step are improving.

The algorithm converges faster than other numerical algorithms applied on this issue.

Interim results are also stable trajectories.

No adaptation factor need be chosen before starting the algorithm (which otherwise would produce convergence difficulties when applying first order gradient methods, for example).

The optimal position variant controller gain comes as a by-product of this algorithm.

An exemplary algorithm that can be implemented can be described as follows:

1. Estimate a sequence of control values $th_k$ and solve the systems equation $$v_{k+1} = f(s_k, v_k, th_k), v(x_0) = v_0, k = 0, \ldots, N-1. \quad \text{(Eq. 43)}$$

In this case, the sequence of control values is determined by controlling the system equation (Eq. 43) with a position variant controller:

$$\hat{th}_k = \frac{v_{desired}}{B}\left(-A_1 v_{desired} - A_2 - \frac{A_3(s_k)}{v_{desired}}\right) \quad \text{(Eq. 44)}$$

$$th_k = \hat{th}_k - G \cdot (v_k - v_{desired})$$

where $A_1, A_2, A_3$, and B are determined by Eq. 12 and G is the controller gain factor. While forward calculating of Eq. 43 together with Eq. 44, the values of $V_k$ and $th_k$ must be recorded.

2. Next, determine the appropriate Lagrangian multipliers by backward calculation of Eq. 38 and Eq. 41. Since the sequences of $v_k$ and $th_k$ are usually not optimal, Eq. 40 is not fulfilled; therefore, the values of $$H_{th}^k = \frac{\partial H}{\partial th_k} \quad \text{(Eq. 45)}$$

must be recorded for further computations.

3. Now, solve the so called influence equations backward:

$$P(k) = Z_{vv}(k) - Z_{vth}(k)Z_{thth}^{-1}(k)Z_{thv}(k), P(N) = \frac{\partial^2 \Phi}{\partial v_N^2} \quad \text{(Eq. 46)}$$

$$\xi(k) = f_v^k \xi(k+1) - Z_{vth}(k)Z_{thth}^{-1}(k)(f_{th}^k \xi(k+1) - \Delta H_{th}^k),$$

$$\xi(N) = 0$$

where $$f_v^k = \frac{\partial f(s_k, v_k, th_k)}{\partial v_k}, H_{vth}^k = \frac{\partial^2 H^k}{\partial v_k \partial th_k}, \text{etc.} \quad \text{(Eq. 47)}$$

and $$Z_{thth}(k) = H_{thth}^k + P(K+1)(f_{th}^k)^2 \quad \text{(Eq. 48)}$$
$$Z_{thv}(k) = Z_{vth}(k) = H_{thv}^k + f_{th}^k P(k+1)f_v^k$$
$$Z_{vv}(k) = H_{vv}^k + f_v^k P(k+1)f_v^k.$$

$\Delta H_{th}^k$ is chosen as (Eq. 49)

$$\Delta H_{th}^k = -\epsilon H_{th}^k$$

where $0 < \epsilon \leq 1$ is continuously increased every iteration step up to 1 in the last iteration. This choice represents the influence of the first order gradient since $-H_{th}^k$ is in the direction of steepest descent of the cost function.

4. Adapt the sequence of control values $th_k$ by $$(th_k)_{new} = (th_k)_{old} + \Delta th_k \quad \text{(Eq. 50)}$$

where $$\Delta th_k = -Z_{thth}^{-1}(k)(Z_{thv}(k)\Delta v_k + f_{th}^k \xi(k+1) - \Delta H_{th}^k) \quad \text{(Eq. 51)}$$

and $$\Delta v_k = (v_k)_{new} - (v_k)_{old} \quad \text{(Eq. 52)}$$

where $(v_k)_{new}$ is calculated by applying the adapted manipulating variable $th_{k-1}$ on the system equation.

5. Repeat steps 1 through 4 until the number of desired iterations or the desired accuracy is achieved.

Implementation of the Cost Minimizing Algorithm

For an area around the current vehicle positioned ("Prediction Horizon"), the optimal velocity, throttle pedal positions, and controller gain series can be stored in a look-up table (which can be contained in a ring buffer memory, as discussed hereinafter). The resolution of this look-up table is thereby the Integration Step Size h. (The optimal velocity is considered to be constant for small distances h.) The output values of the PCC system can then be determined by reading out the values corresponding to the estimated vehicle position.

The look-up table values can be calculated online, in real time as the vehicle proceeds along the traveled route. Such online, real time calculation adapts the look-up table during the drive by taking the current vehicle velocity into account. The advantages of such a system (compared to an offline version in which the stored values are determined in advance and are invariable) are:

- Less memory is needed.
- An online determination gives the opportunity to change the route while driving.
- There is no need for a previous "record drive" by an expert driver, and the system can be used on any route, the first time it is traveled.
- When vehicle velocity drifts significantly from the velocity stored in the look-up table for the current position (as might be caused, for example, by a slower vehicle driving ahead), the velocity values for the following positions in the look-up table then can no longer be considered to be optimal. In this case an online version of the algorithm can adapt these values by taking the current velocity into account.
- An on-line version has the advantage of being able to adapt the optimal trajectories to variable vehicle parameters, such as vehicle mass, which has a significant impact on the dynamics of the vehicle.

It is therefore desirable to implement an optimization algorithm in a manner which permits online adaptation of a look-up table. While the optimization calculation can be performed for every computational cycle given enough computing power, this approach is not used in an exemplary implementation. Rather, in one embodiment a new optimization calculation only occurs once the vehicle has covered a specified distance, which is referred to hereinafter as a "frame", or when the set speed is changed. In addition, the calculation can be distributed over several computational cycles to reduce the computational burden.

Figures 10, 11:
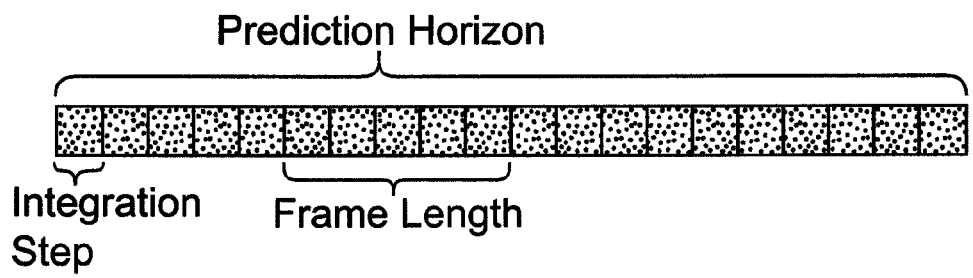
FIG. 10 shows the formatting of data for a prediction horizon form of cruise control that can be used with a vehicle disturbance estimator.
FIG. 11 illustrates a form of ring buffer memory that can be used for performing cruise control calculations.

The whole Prediction Horizon, in one approach can be separated into Frames. In this example, the Prediction Horizon is a multiple of the Frame Length (also measured in number of integration steps h). FIG. 10 shows this separation for a Prediction Horizon of twenty, the Number Of Frames is four, and the resulting Frame Length is five. (This is a simplified version for illustration only.) The parameter "Number of Frames" in this example determines the rate at which the optimal trajectory is updated.

In one exemplary PCC unit, the values for vehicle velocity, throttle position and controller gain calculated as described previously are entered into a ring buffer memory having a capacity that corresponds to the length (in frames and integration steps) of the Prediction Horizon, together with the following variables for the calculation of the exemplary optimization algorithm:

- the Lagrangian multiplier v
- the influence variables $\xi$ and P,
- the partial derivative of the Hamiltonian by the throttle pedal position $H_{th}$,
- the angles $\phi$ (representing the grade of the road) and the curve radii r.

FIG. 11 shows the resulting memory arrangement of the exemplary ring buffer.

Figure 12A:
FIGS. 12a-c show the ring buffer memory status during an initialization state prior to operation of the vehicle.
Figure 12B:
Figure 12C:
Figure 13A:
FIGS. 13a-d show the operation of an exemplary cruise control optimization algorithm that can be used in combination with a vehicle disturbance estimator during driving of the vehicle.
Figure 13B:
Figure 13C:
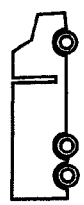

The sequence of the illustrative optimization algorithm will now be explained by reference to the example ring buffer of FIG. 11. FIGS. 12a-c show an initialization stage in which the whole Prediction Horizon (except for the last frame) is calculated, while FIGS. 13a-c illustrate the operation of the ring buffer while the vehicle is driving.

The initialization of the ring buffer (FIG. 12a-c) is completed before the vehicle reaches the start point on the road where the PCC system is triggered. Two stages of the initialization can be distinguished:

1. First, the ring buffer memory is filled with angle and radius values from cell zero up to the last cell of the next to last frame. (FIG. 12a) (For example, the value $\phi_k$ is the grade of the road at the position specified by the driven distance since the start point $S_k$=k·h (where again h is the Integration Step Size), as read from the road map 174 (FIG. 6). While filling these ring buffer cells, starting values are estimated for the velocity trajectory, and the appropriate throttle pedal positions are computed, as illustrated in FIG. 12b.
2. In the second step several optimization iterations are applied on the memory range described above until the algorithm has converged and thus the values are optimal, as shown in FIG. 12c.

The white background of the velocity memory cells in FIG. 12b indicates that these values are starting estimates obtained by applying a conventional cruise controller, and thus are not optimal. The dark background in FIG. 12c indicates that the velocity values are optimal.

Figure 14:
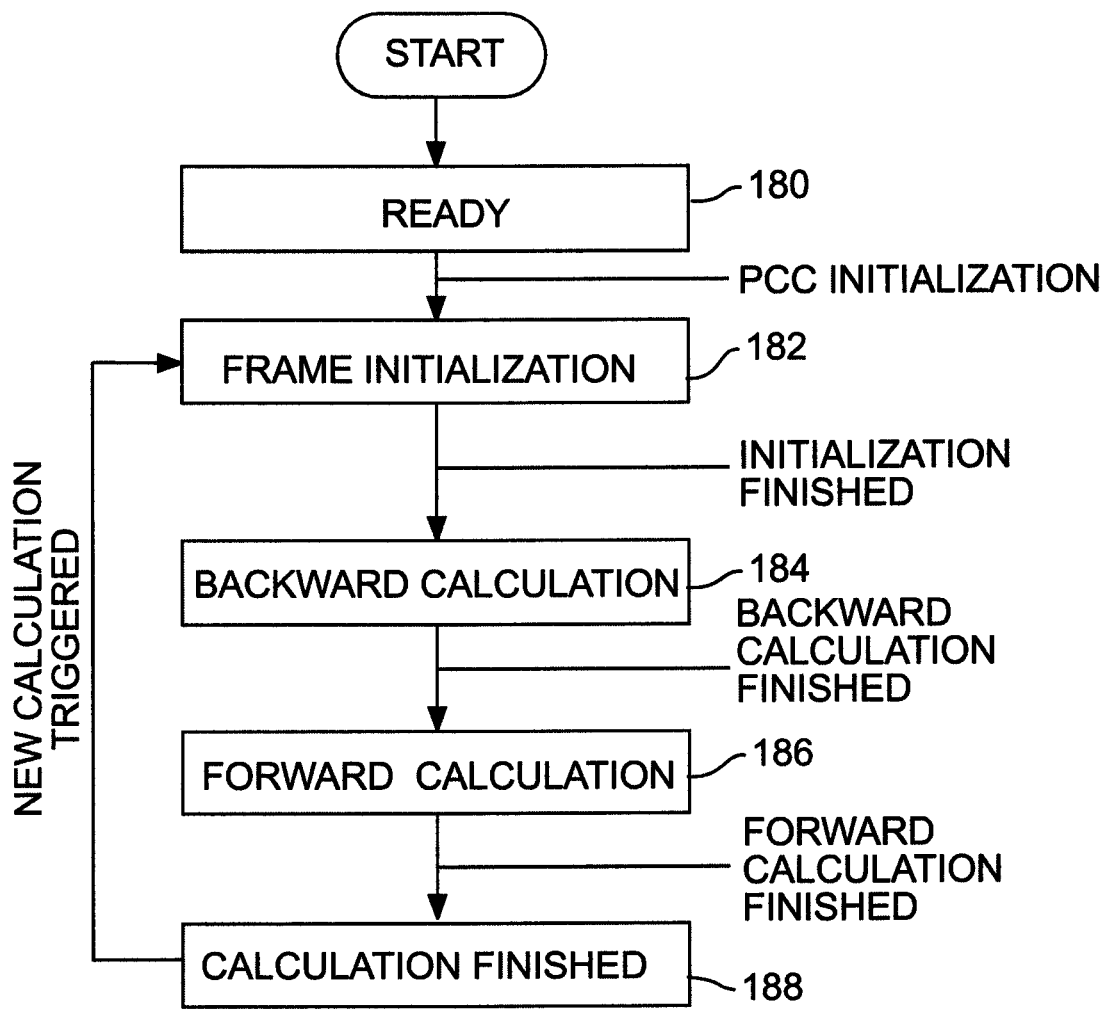
FIG. 14 is a flow chart that illustrates the operation of the optimization algorithm of FIGS. 13a-d.

Operation of the illustrative optimization algorithm module has five different states, as shown in FIG. 14. They are as follows:

- READY (Step 180): The module remains in this state until the initial calculation is started.
- FRAME_INITIALIZATION (Step 182): A frame is filled with road data and estimated starting values of v and th are made for this frame.
- BACKWARD_CALCULATION (Step 184): For a specified range in the ring buffer the series of $\lambda$, P, $\xi$ and $H_{th}$ are calculated simultaneously (as described previously) and stored in the respective ring buffer cells.
- FORWARD_CALCULATION (Step 186): The velocity, throttle and controller gain values are adapted, according to step 4 of the algorithm.
- CALCULATION_FINISHED (Step 188): If all calculations are completed before the vehicle reaches the end of the current frame, then the algorithm module remains in this state until a new calculation is triggered.

In the illustrated example, after the vehicle has passed the start point, the output values for the respective vehicle positions are read out of the first frame. Meanwhile, no further calculations are done. When the vehicle reaches the end of the first frame a new calculation is triggered:

1. The start and final index of the current frame for which initialization is to take place, and the start and final index of the ring buffer range for which optimization iteration is to take place in this example are fixed. The calculation is started by setting the calculation state to FRAME_INITIALIZATION (182). In the example in FIG. 13, the bounding indices for the frame initialization are the first and the last indices of Frame 3. The starting value for the velocity and throttle start estimations is the velocity value stored in the last index of Frame 2 (FIG. 13.a).
2. When the frame initialization is finished, the calculation state switches to BACKWARD_CALCULATION (184) and afterwards to FORWARD_CALCULATION (186), and thus a whole optimization iteration is applied on the specified range in the ring buffer (FIG. 13b). The current vehicle velocity is desirably used as the start velocity in order to take the actual vehicle state into account. In FIG. 13b, the light gray background of the velocity memory cells of Frame 3 indicate that these values are "more optimal" than the start estimations since one optimization iteration step is applied on them. All of these calculations are desirably performed while the vehicle is driving in the first frame. The output values of the PCC system (FIG. 6) are read out of the first frame, which constitutes an exemplary "look-up table" for this purpose. The calculations in this example are finished when the vehicle reaches the end of Frame 1, so that synchronization of the optimization algorithm and vehicle movement does not fail. If synchronization is lost, the exemplary PCC system can stop all computations and switch to failure mode.

Figure 13D:

3. FIGS. 13*c* and *d* show the state of the ring buffer when the vehicle is driving in Frame 2. This time Frame 0 is filled with road data and starting value estimates (FIG. 13*c*), and an optimization iteration is applied on Frames 2, 3, and 0 (FIG. 13*d*). The background color of the velocity cells of Frame 3 are now darker than in the previous step, denoting that now two optimization iterations have been performed for this memory range, and so these values approach closer to the optimal values.

In the example of FIGS. 12 and 13, the parameters Prediction Horizon and Number of Frames are chosen to be very small in order to make the basic operation of the ring buffer clear. Realistic values for the Prediction Horizon would be 4000 assuming an Integration Step Size of 1 m, and 200 for the Number of Frames. Thus, nearly 200 optimization iteration steps are performed with regard to the values in one frame before they are actually read out. This number is more than enough in this example for the algorithm to converge to the optimal values. Therefore, it is sufficient to compute one optimization per frame.

Figure 15:
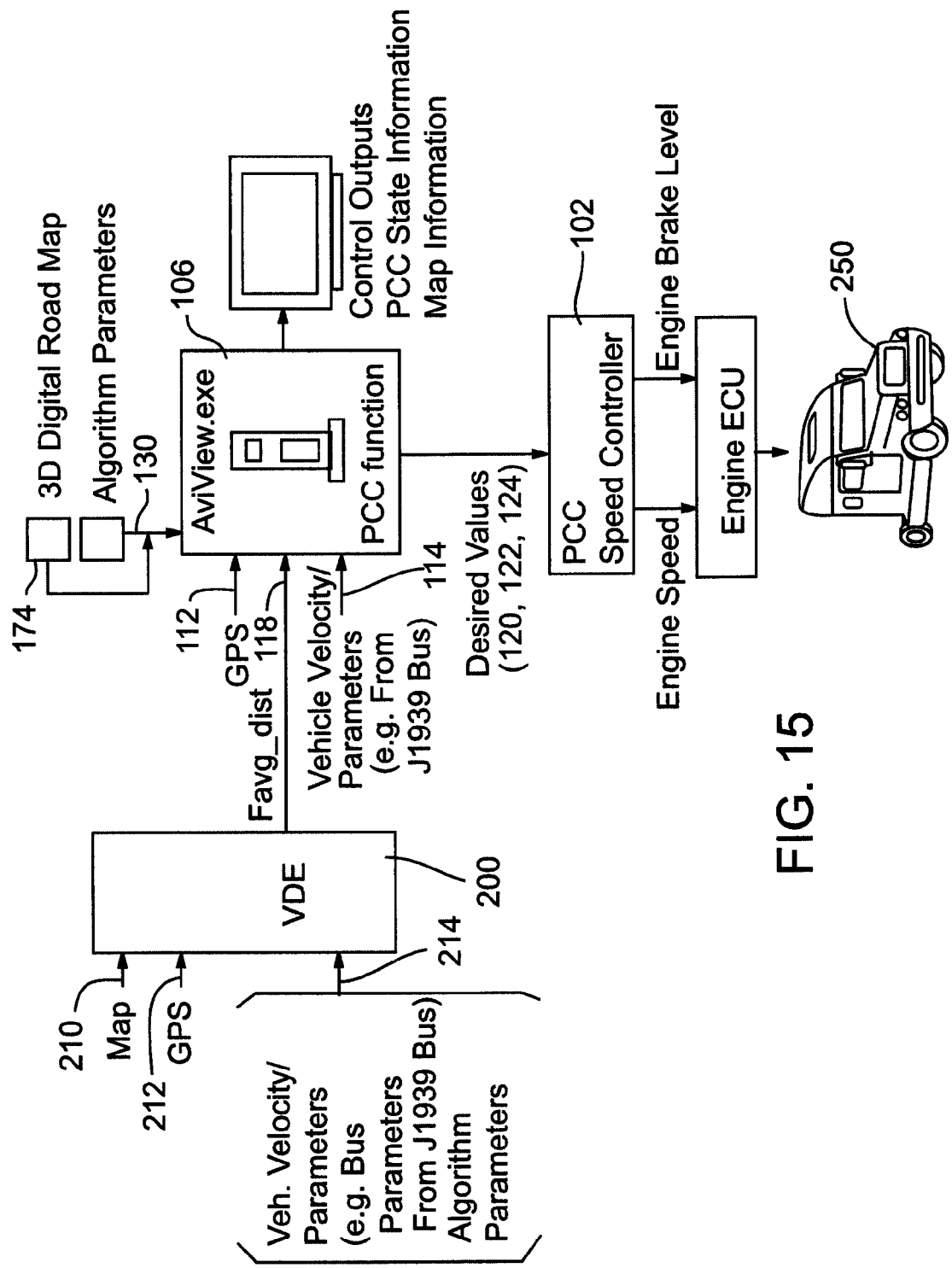
FIG. 15 shows an exemplary implementation of the vehicle disturbance estimator inclusive cruise control system in a vehicle.

FIG. 15 shows an exemplary combined VDE and PCC system implemented in a vehicle 250.

Figure 16:
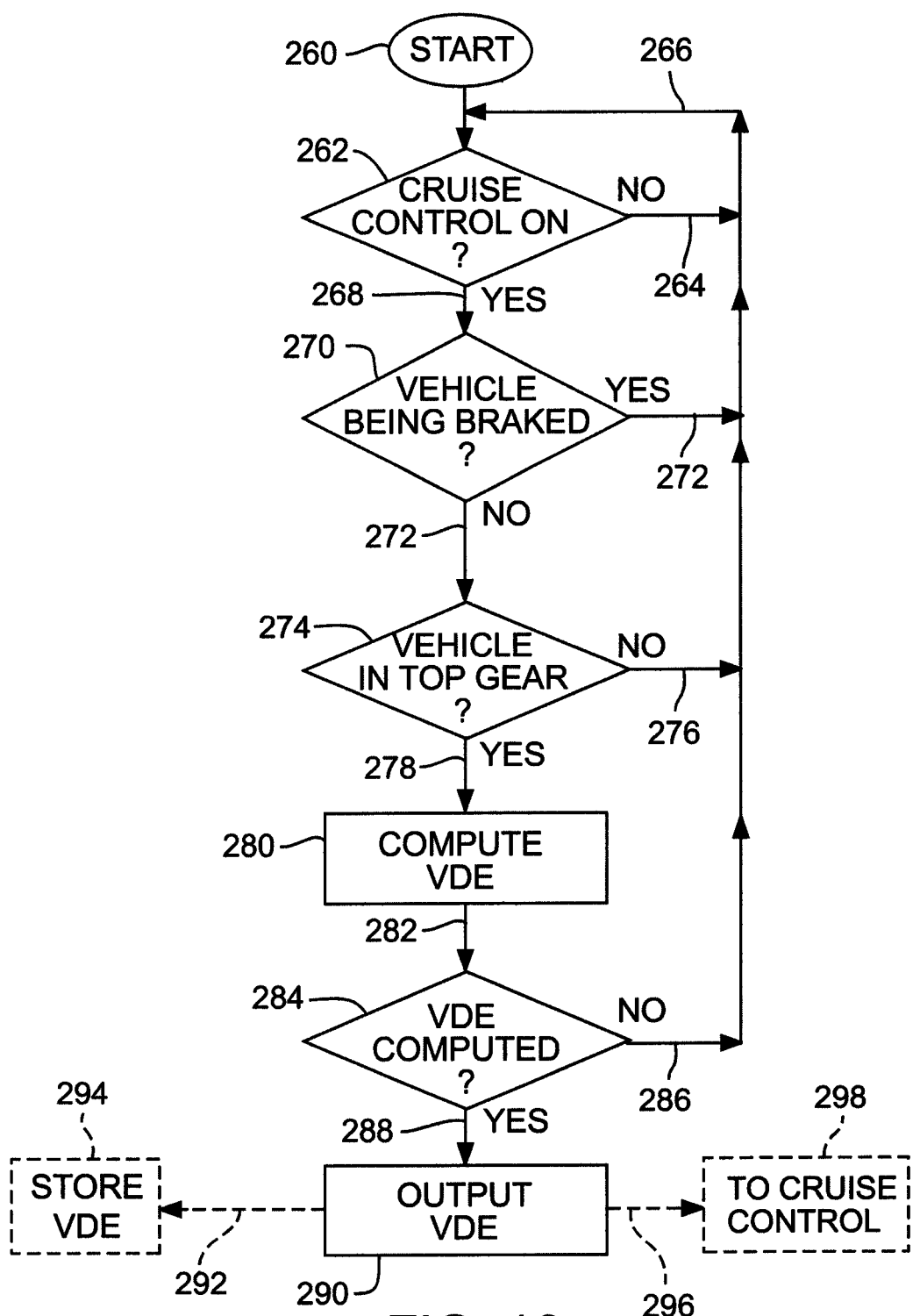
FIG. 16 shows an exemplary flow chart illustrating an embodiment of a vehicle disturbance estimator method and exemplary applications of determined vehicle disturbance estimates.

FIG. 16 illustrates an exemplary flow path for one embodiment of a VDE system. At 260 the system starts. At block 262, a determination is made as to whether a cruise control for the vehicle is on (active). If the answer is no, branch 264 is followed to branch 266, with the flow path returning to block 262 where the question is repeated until such time as the answer is yes. When a yes answer is determined at block 262, flow path 268 is followed to block 270 at which a determination is made as to whether the vehicle is being braked. If the answer is yes, the flow path 272 is followed to path 266, and process continues. If the vehicle is not being braked, flow path 272 is followed from block 270 to a block 274. At block 274, a determination is made as to whether the vehicle is in the top gear. If the answer is no, flow path 276 is followed to path 266. On the other hand, if a yes answer is determined at block 274, flow path 278 is followed to a block 280 and one or more vehicle disturbance estimates, and desirably plural vehicle disturbance estimates are computed. Flow path 282 is then followed to block 284, wherein a determination is made as to whether the vehicle disturbance estimates have been computed. If no, flow path 286 is followed to the flow path 266, and the process continues. If the answer is yes at block 284, flow path 288 is followed to a block 290. At block 290, computed vehicle disturbance estimates are provided as an output. This output can be, as previously explained, an average (which may or may not be weighted) of a plurality of vehicle disturbance estimates. Typically, flow path 292 is followed with the outputs being stored in storage at 294. The stored vehicle disturbance estimates can be used in vehicle diagnostics and fuel efficiency testing, such as previously explained, as well as for other purposes. In an implementation where the VDE is used to assist in controlling a cruise controller, the outputs from block 290 are provided along flow path 296 to a cruise control 298 for use in controlling the speed of the vehicle. It should be noted in FIG. 16 that the ordering of blocks 262, 270 and 274 can be changed as they need not be reached in the order they appear in this particular figure.

The foregoing disclosure has been set forth merely to illustrate embodiments of the invention that is not to be construed as limiting. Since modifications of the disclosed embodiments incorporating the spirit and substance of the invention can be made by persons skilled in the art, the invention should include all such modifications within the scope of the appended claims and equivalents thereof.

We claim:

1. A vehicle disturbance estimator for a motor vehicle, the motor vehicle comprising a cruise control, a plurality of gears, at least one brake, and a vehicle bus for carrying plural signals corresponding to motor vehicle parameters, the vehicle disturbance estimator comprising:
   a microprocessor comprising first, second and third sets of inputs;
   the first set of inputs comprising inputs corresponding to first parameters of the motor vehicle, the first parameters comprising:
   Gross Vehicle Mass;
   Static Wheel Radius;
   Nominal Drag Coefficient;
   Nominal Rolling Resistance Coefficient; and
   Vehicle Frontal Area;
   the second set of inputs comprising inputs corresponding to second parameters of the motor vehicle, the second parameters comprising:
   Engine Brake State;
   Engine Torque;
   Engine Speed;
   Wheel Based Vehicle Speed; and
   Service Brake State;
   the third set of inputs comprising inputs corresponding to the grade of the road being travel by the motor vehicle;
   the microprocessor being operable to process the first, second and third sets of inputs to determine plural vehicle disturbance estimates for time periods during which the following conditions exist: the cruise control is on, the vehicle is being driven in the highest gear, and the vehicle is not being braked by any brakes;
   the microprocessor providing signals corresponding to the plural vehicle disturbance estimates; and
   memory for storing the signals corresponding to the plural vehicle disturbance estimates.

2. A vehicle disturbance estimator according to claim 1 wherein the second set of inputs comprise inputs from the vehicle bus.

3. A vehicle disturbance estimator according to claim 1 wherein all of the second set of inputs are inputs from the vehicle bus.

4. A vehicle disturbance estimator according to claim 1 wherein the first set of
inputs comprises inputs corresponding to first parameters that further comprise:
   Engine and Flywheel Inertia;
   Total Wheel Inertia;
   Transmission Efficiency per Gear; and
   Rear Axle Efficiency per Gear; and
   wherein the second set of inputs comprise inputs corresponding to second parameters that further comprise:
   Fan Drive State; and
   Friction Torque.

5. A vehicle disturbance estimator according to claim 1 wherein the second set of inputs comprise inputs corresponding to second parameters that further comprise:
   Bunk Blower Fan State;
   Cab Blower Fan State;
   Air Conditioning Compressor State;

Non-Driven Wheel Speed;
Transmission Driveline Engaged;
Engine Percent Load at Current Speed;
Transmission Current Gear;
Longitudinal Acceleration;
Estimated Engine Parasitic Losses—Percent Torque for fan and fuel pump;
Barometric Pressure; and
Ambient Air Temperature.

6. A vehicle disturbance estimator according to claim 5 wherein the second set of inputs comprise inputs corresponding to second parameters that further comprise:
Transmission Shift in Process;
Transmission Output Shaft Speed; and
Transmission Input Shaft Speed.

7. A vehicle disturbance estimator according to claim 5 wherein the second set of inputs comprise inputs from the vehicle bus corresponding to second parameters that further comprise the Transmission Actual Gear Ratio.

8. A vehicle disturbance estimator according to claim 5 wherein the second set of inputs comprise inputs corresponding to second parameters that further comprise the clutch shift status or state.

9. A vehicle disturbance estimator according to claim 5 wherein the second set of inputs comprise inputs corresponding to second parameters that further comprise:
Windshield Wiper State;
Transmission Shift in Process;
Transmission Shift in Process;
Transmission Output Shaft Speed;
Transmission Input Shaft Speed;
Transmission Actual Gear Ratio;
Transmission Current Gear; and
The Clutch Switch State.

10. A vehicle disturbance estimator according to claim 1 wherein the second set of inputs comprise inputs corresponding to second parameters that further comprise the Clutch Switch State.

11. A vehicle disturbance estimator according to claim 1 wherein the second set of inputs comprise inputs corresponding to second parameters that further comprises the Fuel Rate.

12. A vehicle disturbance estimator according to claim 1 wherein the first set of inputs comprises inputs corresponding to the first parameters that further comprise:
Truck Type;
Truck Model;
Truck Configuration;
Transmission Type;
Rear Axle Type;
Tractor-Trailer Gap;
Tire Pressure and Temperature;
Wind Direction and Velocity; and
Road Surface Condition.

13. A vehicle disturbance estimator according to claim 5 wherein the first set of inputs comprises inputs corresponding to first parameters that further comprise:
Truck Type;
Truck Model;
Truck Configuration;
Transmission Type;
Rear Axle Type;
Tractor-Trailer Gap;
Tire Pressure and Temperature;
Wind Direction and Velocity; and
Road Surface Condition.

14. A vehicle disturbance estimator according to claim 7 wherein the first set of inputs comprises inputs corresponding to first parameters that further comprise:
Truck Type;
Truck Model;
Truck Configuration;
Transmission Type;
Rear Axle Type;
Tractor-Trailer Gap;
Tire Pressure and Temperature;
Wind Direction and Velocity; and
Road Surface Condition.

15. A vehicle disturbance estimator according to claim 9 wherein the first set of inputs comprise inputs corresponding to first parameters that further comprise:
Truck Type;
Truck Model;
Truck Configuration;
Transmission Type;
Rear Axle Type;
Tractor-Trailer Gap;
Tire Pressure and Temperature;
Wind Direction and Velocity; and
Road Surface Condition.

16. A vehicle disturbance estimator according to claim 1 wherein the microprocessor is operable to apply Kalman filtering to the first, second and third inputs to determine the vehicle disturbance estimates.

17. A vehicle disturbance estimator according to claim 1 wherein the microprocessor is operable to determine an average vehicle disturbance estimate from a plurality of vehicle disturbance estimates.

18. A vehicle disturbance estimator according to claim 1 wherein each of the vehicle disturbance estimates corresponds to a vehicle disturbance estimate for a sampling time period.

19. A vehicle disturbance estimator according to claim 18 wherein the microprocessor is operable to average signals corresponding to plural vehicle disturbance estimates to provide an output corresponding to an average vehicle disturbance estimate over a plurality of sampling time periods.

20. A vehicle disturbance estimator according to claim 19 wherein the average vehicle disturbance estimate comprises an input to the cruise control, the cruise control being operable to control the speed of the motor vehicle based in part upon the average vehicle disturbance estimate.

21. A vehicle disturbance estimator according to claim 1 wherein signals corresponding to the stored signals comprise an input to the cruise control, the cruise control being operable to control the speed of the motor vehicle based in part upon the output signals.

22. A vehicle disturbance estimator according to claim 21 wherein the signals corresponding to the stored signals comprise signals corresponding to averages of plural vehicle disturbance estimates.

23. A vehicle disturbance estimator for a motor vehicle, the motor vehicle comprising a cruise control, a plurality of gears, at least one brake, and a vehicle bus for carrying plural signals corresponding to motor vehicle parameters, the vehicle disturbance estimator comprising:
a microprocessor comprising first, second and third sets of inputs;
the first set of inputs comprising inputs corresponding to first parameters of the motor vehicle, the first parameters comprising:
Gross Vehicle Mass;
Static Wheel Radius;

Nominal Drag Coefficient;
Nominal Rolling Resistance Coefficient; and
Vehicle Frontal Area;
the second set of inputs comprising inputs corresponding to second parameters of the motor vehicle, the second parameters comprising:
Engine Brake State;
Engine Torque;
Engine Speed;
Wheel Based Vehicle Speed; and
Service Brake State;
the third set of inputs comprising inputs corresponding to the grade of the road being travel by the motor vehicle;
the microprocessor being operable to process the first, second and third sets of inputs to determine plural vehicle disturbance estimates for time periods during which the following conditions exist: the cruise control is on, the vehicle is being driven in the highest gear, and the vehicle is not being braked by any brakes;
the microprocessor providing signals corresponding to the plural vehicle disturbance estimates; and
wherein the signals corresponding to the plural vehicle disturbance estimates are provided as an input to the cruise control, the cruise control being operable to control the speed of the motor vehicle based at least in part upon the vehicle disturbance estimates.

24. A method of operating a motor vehicle comprising:
determining vehicle disturbance estimates using a microprocessor, the vehicle disturbance estimates being determined for the periods corresponding to the vehicle being driven in the top gear; the vehicle having cruise control that is on and the vehicle brakes not being applied to the vehicle;
delivering signals corresponding to the vehicle disturbance estimates as an input to a cruise control;
controlling the operation of the cruise control based in part upon the vehicle disturbance estimates.

25. A method according to claim 24 wherein vehicle disturbance estimates comprise a lumped signal corresponding to plural forces acting along the longitudinal axis of the motor vehicle.

26. A method according to claim 25 wherein the plural forces correspond at least in part to lumped contributions of rolling resistance forces and wind forces determined in real time.

27. A method according to claim 25 wherein the plural forces correspond at least in part to forces retarding the acceleration of the vehicle arising from the operation of one or more auxiliary components of the motor vehicle.

28. A method according to claim 27 wherein the auxiliary components comprise an engine cooling fan of the vehicle.

29. A method according to claim 28 wherein the auxiliary components also comprise one or more of cab and bunk blowers and vehicle air conditioning compressor.

30. A method according to claim 24 wherein the act of delivering signals comprises delivering signals corresponding to the average of a plurality of vehicle disturbance estimates.

31. A method according to claim 24 comprising using Kalman filtering to determine the vehicle disturbance estimates.

32. A method of diagnosing the operation of a motor vehicle having cruise control comprising:
operating the motor vehicle;
computing vehicle disturbance estimates as the vehicle is operated using a microprocessor;
the vehicle disturbance estimates being computed when the vehicle is being driven in the top gear, cruise control is on and the vehicle is not being braked; and
diagnosing motor vehicle performance based upon computed vehicle disturbance estimates.

33. A method of evaluating fuel efficiency tests comprising:
conducting one fuel efficiency test run of a motor vehicle over a route;
computing at least a first vehicle disturbance estimate using a microprocessor for said one fuel efficiency test run;
conducting another fuel efficiency test run of a motor vehicle over the route;
computing at least a second vehicle disturbance estimate using a microprocessor for said another fuel efficiency test run;
discarding the results of a fuel efficiency test run when the vehicle disturbance estimate for the test run exceeds a threshold.

34. A method according to claim 33 wherein the first and second vehicle disturbance estimates each comprise an average of a plurality of vehicle disturbance estimates over the associated test run.

* * * * *